United States Patent
Jackson et al.

(10) Patent No.: US 11,289,443 B2
(45) Date of Patent: Mar. 29, 2022

(54) MICROSPRING STRUCTURE FOR HARDWARE TRUSTED PLATFORM MODULE

(71) Applicant: Palo Alto Research Center Incorporated, Palo Alto, CA (US)

(72) Inventors: Warren B. Jackson, San Francisco, CA (US); Vanishree Rao, Mountain View, CA (US); Eugene M. Chow, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 640 days.

(21) Appl. No.: 15/492,799

(22) Filed: Apr. 20, 2017

(65) Prior Publication Data
US 2018/0307863 A1    Oct. 25, 2018

(51) Int. Cl.
| | |
|---|---|
| *H01L 23/00* | (2006.01) |
| *G06F 21/86* | (2013.01) |
| *H01L 23/31* | (2006.01) |
| *G06F 21/57* | (2013.01) |
| *H04L 9/32* | (2006.01) |

(52) U.S. Cl.
CPC ............. *H01L 24/72* (2013.01); *G06F 21/57* (2013.01); *G06F 21/86* (2013.01); *H01L 23/3157* (2013.01); *H04L 9/3234* (2013.01); *H01L 2224/72* (2013.01); *H01L 2924/0104* (2013.01); *H01L 2924/01024* (2013.01); *H01L 2924/01028* (2013.01); *H01L 2924/01042* (2013.01); *H04L 2209/127* (2013.01); *H04L 2209/805* (2013.01); *H04L 2209/88* (2013.01)

(58) Field of Classification Search
CPC ..... G06F 21/575; G06F 21/86; H04L 67/327; H04L 9/3234; H01L 23/3157; H01L 24/72; H01L 2924/01028; H01L 2924/01024; H01L 2924/01042; H01L 2924/0104
USPC ........................................................ 713/192
See application file for complete search history.

(56) References Cited

U.S. PATENT DOCUMENTS

| | | | |
|---|---|---|---|
| 6,856,225 B1 | 2/2005 | Chua et al. | |
| 7,293,996 B2 | 11/2007 | Van Schuylenbergh et al. | |
| 8,441,808 B2 | 5/2013 | Chow | |
| 8,448,238 B1 * | 5/2013 | Gupta | H04L 67/327 726/15 |
| 8,519,534 B2 | 8/2013 | Chow et al. | |
| 2002/0146919 A1 * | 10/2002 | Cohn | H01L 24/13 439/66 |
| 2005/0012212 A1 * | 1/2005 | Gilleo | H01L 24/81 257/737 |
| 2010/0235648 A1 * | 9/2010 | Hoang | G06F 21/575 713/189 |

(Continued)

*Primary Examiner* — Bryan F Wright
(74) *Attorney, Agent, or Firm* — Mueting Raasch Group

(57) ABSTRACT

A secured system includes at least one semiconductor chip comprising information processing circuitry. An array of contact pads is disposed on a surface of the chip and is electrically coupled to the information processing circuitry. The secured system includes one or more semiconductor chiplets. Each chiplet comprises at least a portion of at least one hardware trusted platform module that cryptographically secures the information processing circuitry. An array of electrically conductive microsprings is disposed on a surface of the chiplet and is electrically coupled between the hardware trusted platform module and the contact pads.

27 Claims, 19 Drawing Sheets

(56) References Cited

U.S. PATENT DOCUMENTS

2011/0260162 A1* 10/2011 Loisel .............. G06K 19/07372
257/48

* cited by examiner

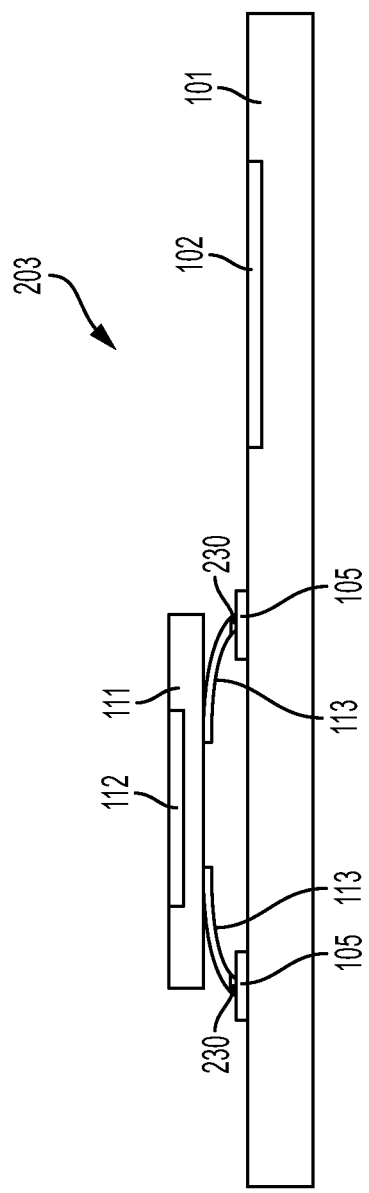
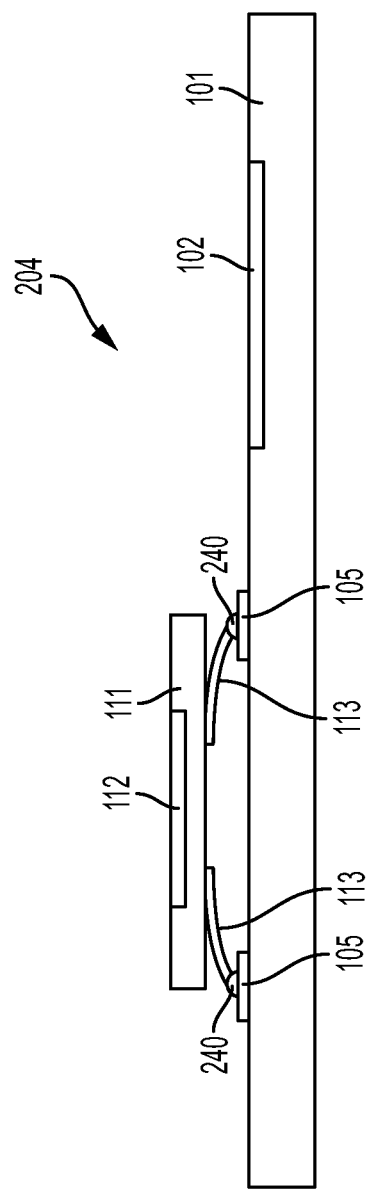
FIG. 2C
FIG. 2D

MICROSPRING STRUCTURE FOR HARDWARE TRUSTED PLATFORM MODULE

TECHNICAL FIELD

This application relates generally to a device comprising a removable chiplet for a hardware trusted platform module and to systems and methods related to such devices.

BACKGROUND

A trusted platform module (TPM) refers to a cryptoprocessor configured to secure the operations of a computer system. The most secure TPMs are implemented in hardware, those implemented in software are less secure because of software's vulnerability to remote intrusions, unauthorized access, and repurposed code. TPMs are trusted to perform one or more security-critical functions for the computer system, such as verify software, protect cryptographic keys, and/or provide device authentication.

SUMMARY

Some embodiments are directed to a secured system that includes at least one semiconductor chip comprising information processing circuitry. An array of contact pads is disposed on a surface of the chip and is electrically coupled to the information processing circuitry. The secured system includes one or more semiconductor chiplets. Each chiplet comprises at least a portion of at least one hardware trusted platform module that cryptographically secures the information processing circuitry. An array of electrically conductive microsprings is disposed on a surface of the chiplet and is electrically coupled between the hardware trusted platform module and the contact pads.

According to some embodiments, a device includes one or more semiconductor chiplets. Each chiplet comprises at least a portion of at least one hardware module configured to communication with information processing circuitry that is not disposed on the chiplet. An array of electrically conductive microsprings is disposed on a surface of the chiplet and is electrically coupled to the hardware module. The microsprings are configured to make electrical contact with contact pads disposed on a surface of a chip that are electrically coupled to the information processing circuitry.

Some embodiments are directed to a method of cryptographically securing information processing circuitry. Electrical signals representing security information are generated in the information processing circuitry disposed on a semiconductor chip. The electrical signals are transferred though an array of electrically conductive microsprings to a chiplet removably mounted to the chip. The chiplet comprises at least a portion of a hardware trusted platform module that secures the information processing circuitry. The security information represented in the electrical signals is verified in the hardware trusted platform module. Secure operations are provided to the information processing circuitry based on verifying the security information.

In accordance with some embodiments, a secured system includes at least one semiconductor chip comprising information processing circuitry and one or more semiconductor chiplets removably attached to the chip. Each chiplet comprises at least a portion of at least one hardware trusted platform module that cryptographically secures the information processing circuitry. An array of electrical connections is electrically coupled between the hardware trusted platform module and the contact pads. The electrical connections are configured to provide for communication between the information processing circuitry and the hardware trusted platform module at a bandwidth in a range of about 1 gigabit per second per layer per millimeter of linear distance along an edge of the chiplet to about 10 terabits per second per layer per millimeter of linear distance along an edge of the chiplet.

BRIEF DESCRIPTION OF THE DRAWINGS

FIGS. 2C and 2D respectively show a chiplet secured to pads of a chip by welding and soldering in accordance with some embodiments;

The figures are not necessarily to scale. Like numbers used in the figures refer to like components. However, it will be understood that the use of a number to refer to a component in a given figure is not intended to limit the component in another figure labeled with the same number.

DESCRIPTION

Figure 1:
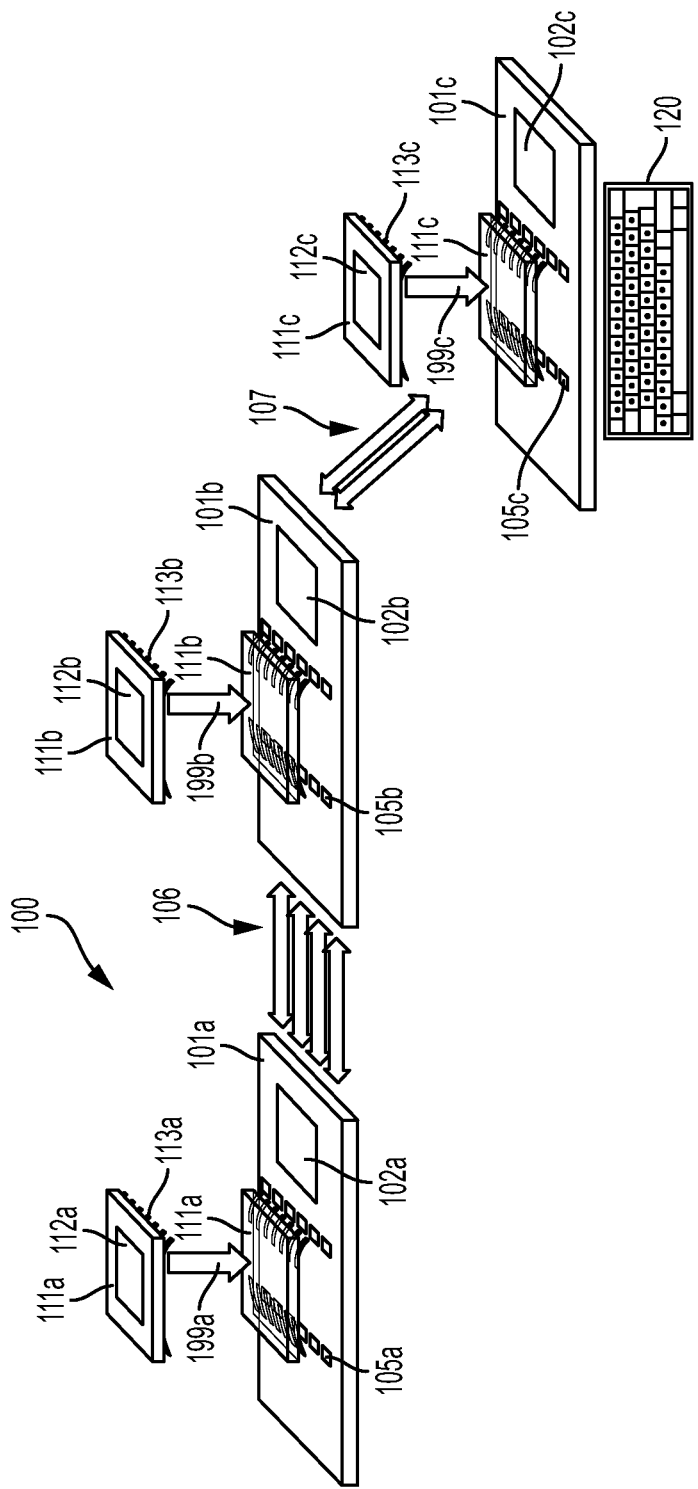
FIG. 1 illustrates a secured system that includes at least one semiconductor chip that contains information processing circuitry and at least one semiconductor chiplet that contains a hardware trusted platform module that cryptographically secures the information processing circuitry in accordance with some embodiments.

Trusted platform modules are cryptoprocessors that are used to secure data in a database, to authenticate the hardware of system that includes information processing circuitry, to provide for secure communications between components of such a system, and/or to provide other security functions for an information processing system. Hardware TPMs are generally more secure than TPMs implemented in software because the hardware TPM requires the physical presence of the TPM hardware and are not easily modified. Software TPMs are more vulnerable to bad actors including key stroke loggers and malware. It is desirable for TPMs to be capable of very rapid computations and high bandwidth communications so as to not to slow down performance of the computer system as the security functions are performed.

With the rapid expansion of computing devices, such as the Internet of Things (IoT) and mobile devices, an increasing number of interconnected systems need to be secured. Mobile systems have specified cost budgets, so low cost security hardware components are desirable.

Chips that incorporate hardware TPMs have a high degree of security and are capable of communicating with the associated information processing circuitry at high bandwidth, providing for reduced lag time in system operations due to the security protocols of the hardware TPM. However, on-chip hardware TPMs lack flexibility because they have to be physically changed when some emerging new threat emerges or for needed upgrades. Embodiments disclosed herein are directed to a hardware TPM disposed on a separate, removable chiplet electrically coupled to the information processing circuitry of the chip through a dense microspring array. The dense microspring array allows for a removable lightweight chiplet that includes a hardware TPM capable of communicating with the information processing system on the chip at high bandwidth. Although the examples provided herein are directed to a chiplet that includes a hardware TPM, the disclosed approaches are applicable generally to chiplets that incorporate any hardware module, particularly where high bandwidth and removability are desirable.

The microspring security chiplets described herein enable the system designer to separate the security function from the operation of the information processing circuitry of a secured system. Therefore, the cost of providing a highly secure and effective trusted TPM can be provided at low cost for even cheap, inexpensive applications, such as internet of things (IoT) systems. The design, fabrication, testing, and deployment of the modular replaceable hardware TPM disclosed herein enables the total secured system costs (of which circuit design, mask design and verification, and fabrication are significant) to be shared by all chips that can use the modular hardware TPM Thus, the expense of the secured system is reduced because the cost of developing the hardware TPM on a chiplet can be spread across many chips. In contrast, if the hardware TPM is built into the mask of each chip, the cost of incorporating a highly secure hardware TPM to each chip adds cost that may be unacceptably high for inexpensive products.

FIG. 1 illustrates a secured system 100 in accordance with some embodiments. The secured system 100 includes at least one semiconductor chip 101a, 101b, 101c comprising information processing circuitry 102a, 102b, 102c. The information processing circuitry 102a, 102b, 102c may be or comprise a processor unit, such as a central processing unit (CPU) and/or graphics processing unit (GPU). The information processing circuitry 102a, 102b, 102c may be or include a floating point gate array (FPGA) and/or may be or include a programmable logic controller (PLC). As shown in FIG. 1, the secured system 100 may include multiple chips 101a, 101b, 101c with information processing circuitry 102a, 102b, 102c in communication with one another through communication channels 106, 107. In an exemplary embodiment, the information processing circuitry 102b of chip 101b may be a central processing unit; the information processing circuitry 102a of chip 101a may be a FPGA for a data storage unit; and the information processing circuitry 102c of chip 101c may be a PLC for input/output processing associated with a keyboard 120 and/or mouse (not shown in FIG. 1).

An array of contact pads 105a, 105b, 105c is disposed on a surface of the chip 101a, 101b, 101c and is electrically coupled to the information processing circuitry 102a, 102b, 102c of the chip 101a, 101b, 101c. The system 100 includes one or more semiconductor chiplets 111a, 111b, 111c, each chiplet 111a, 111b, 111c comprising at least a portion of at least one hardware trusted platform module 112a, 112b, 112c that cryptographically secures the information processing circuitry 102a, 102b, 102c of the associated chip 101a, 101b, 101c. The chiplets 111a, 111b, 111c are shown above the chips 101a, 101b, 101c. The arrows 199a, 199b, 199c and see-through versions of the chiplets 111a, 111b, 111c indicate placement of the chiplets 111a, 111b, 111c on the chips 101a, 101b, 101c. An array of electrically conductive microsprings 113a, 113b, 113c is disposed on a surface of the chiplet 111a, 111b, 111c and is electrically coupled between the hardware trusted platform module 112a, 112b, 112c and the contact pads 105a, 105b, 105c.

The chiplet 111a, 111b, 111c is removably attached to the chip 101a, 101b, 101c. The microsprings 113a, 113b, 113c make mechanical and electrical contact with the contact pads 105a, 105b, 105c on the surface of the chip 101a, 101b, 101c. The chiplet 111a, 111b, 111c can be removed and replaced without degrading the operation of the information processing circuitry 102a, 102b, 102c or requiring specialized equipment, facilities, or chemicals. The change could be performed while the secured system is deployed. For example, the chiplet 111a, 111b, 111c may be removed and replaced with another chiplet having an updated hardware trusted platform module.

In some embodiments, the chiplet 111a, 111b, 111c includes the entire hardware TPM for the information processing circuitry. In some embodiments, the chiplet 111a, 111b, 111c includes only a first portion of the hardware TPM for the information processing circuitry and a second portion of the hardware TPM is located on the chip 101a, 101b, 101c or on another chiplet.

The hardware TPM 112a, 112b, 112c is a cryptoprocessor that can perform one or more of software verification, cryptographic key decryption, and device authentication. For example, the hardware TPM can securely store artifacts, such as passwords, certificates, or encryption keys used to authenticate the information processing circuitry. The hardware TPM can also store measurements that help ensure that the information processing circuitry and executed software and firmware remains trustworthy. The hardware TPM may ensure that the information processing circuitry can prove that it is what it claims to be, a process referred to as authentication. The hardware TPM may be used to prove that the information processing circuitry is trustworthy and has not been breached, a process referred to as attestation According to some embodiments, the hardware TPM can monitor and access the main bus of the information processing circuitry, allowing the hardware TPM to keep track of and report on the configuration state of the information processing circuitry. The nature of hardware-based cryptography ensures that the information stored in hardware is better protected from external software attacks. Applications that store secrets on a hardware TPM can be developed which make it harder to access information without proper authorization. For example, if the configuration of the information processing circuitry has changed as a result of unauthorized activities, the hardware TPM may operate to deny access to data and secrets. Through remote attestation, information processing circuits in a trusted network can make a determination whether and to what extent they can trust information from other information processing circuitry.

The hardware TPM may make use of cryptographic hash operations to detect and prevent data modification, identify keys, and to improve the efficiency of command chaining. For example, the hardware TPM may hash particular command parameters together with a secret value in order to create a multi-bit capability string which cannot be forged by an adversary. This is useful in improving the performance of third-party approved migration, for example, where the third-party produces an authorization certificate processed by the hardware TPM.

The functionality of the hardware TPM can improve security in many areas of computing, including wireless networks, file encryption, password, protection, e-commerce, citizen-to-government applications, online banking, virtual private networks, confidential government communications and many other fields where greater security is required.

Figure 2A:
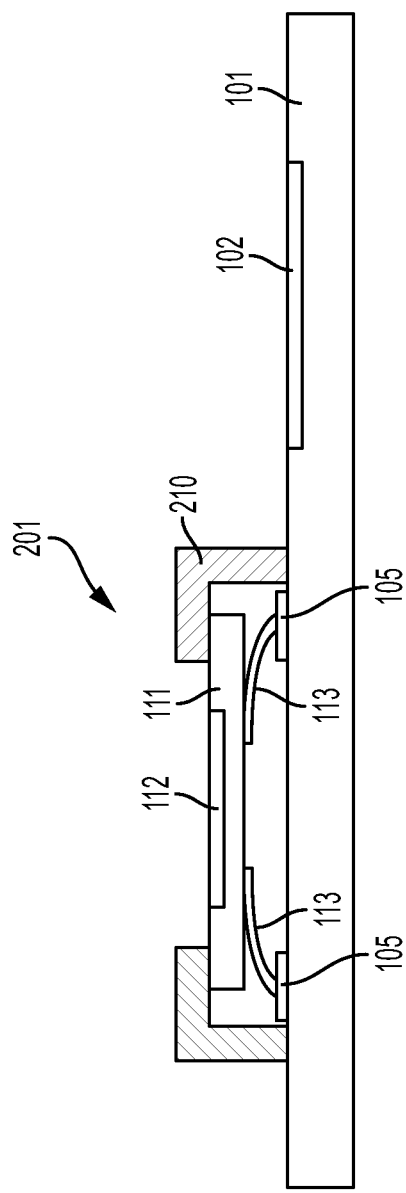
FIG. 2A is a diagram illustrating a chiplet containing a hardware trusted platform module attached to a chip by a mechanical socket in accordance with some embodiments.
Figure 2B:
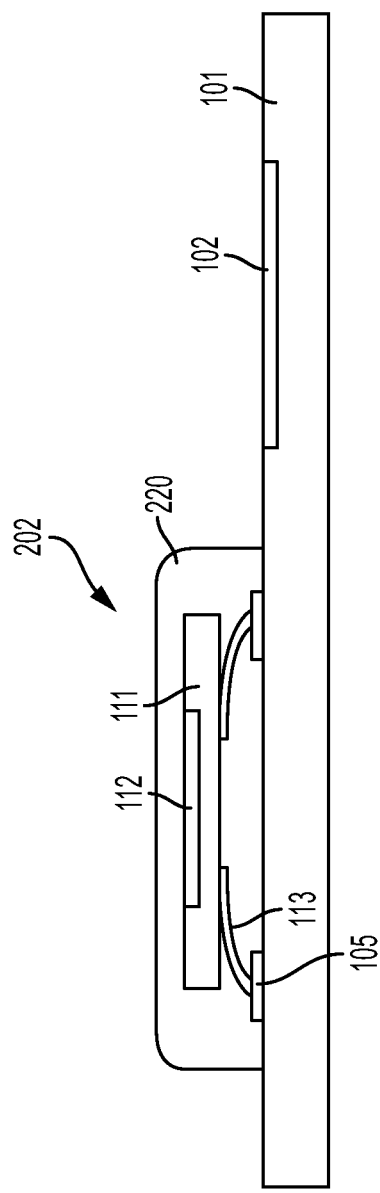
FIG. 2B is a diagram illustrating a chiplet secured to a chip by layer of epoxy in accordance with some embodiments.

FIGS. 2A through 2C illustrate approaches for removably attaching a chiplet 111 that includes a hardware TPM 112 to a chip 101 that includes information processing circuitry 102. In the embodiments of FIGS. 2A through 2C, the information processing circuitry is shown as being disposed on a chip. However, as discussed herein, the hardware TPM can provide for secure operation of a circuit system which may be a chip or may be a multiple chips disposed on a substrate. FIG. 2A shows a secured system 201 comprising a chiplet 111 removably attached to a chip 101. The chiplet 111 includes a hardware TPM 112 that secures information processing circuitry 102 on the chip 101. The hardware TPM 112 is electrically connected to the information processing circuitry 102 via microsprings 113 on the chiplet 111 and contact pads 105 on the chip 101. In some embodiments, as illustrated in FIG. 2A, a removable mechanical socket 210 holds and positions the chiplet 111 so that the microsprings 113 are held in mechanical and electrical contact with the contact pads 105. The microsprings can also be fabricated using multiple layers of metal making the spring act as a shielded transmission line. The shielding makes external eavesdropping on the communicated signals more difficult. Additional information regarding transmission line spring structures is discussed in commonly owned U.S. Pat. No. 7,293,996 which is incorporated herein by reference.

FIG. 2B shows a secured system 202 comprising a chiplet 111 removably attached to a chip 101. The chiplet 111 includes a hardware TPM 112 that secures information processing circuitry 102 on the chip 101. As illustrated in FIG. 2B, in some embodiments, a layer of adhesive 220, e.g., epoxy or other material, is disposed over the chiplet, holding the chiplet 111 so that the microsprings 113 are held in mechanical and electrical contact with the contact pads 105.

FIG. 2C shows a secured system 203 comprising a chiplet 111 removably attached to a chip 101. The chiplet 111 includes a hardware TPM 112 that secures information processing circuitry 102 on the chip 101. As illustrated in FIG. 2C, in some embodiments, the microsprings are welded to the contact pads 105. FIG. 2C illustrates weld material 230 at the interface between the microsprings 113 and contact pads 105.

FIG. 2D shows a secured system 204 comprising a chiplet 111 removably attached to a chip 101. The chiplet 111 includes a hardware TPM 112 that secures information processing circuitry 102 on the chip 101. As illustrated in FIG. 2D, in some embodiments, the microsprings are soldered to the contact pads 105. FIG. 2C illustrates solder 240 at the interface between the microsprings 113 and contact pads 105.

Figure 3:
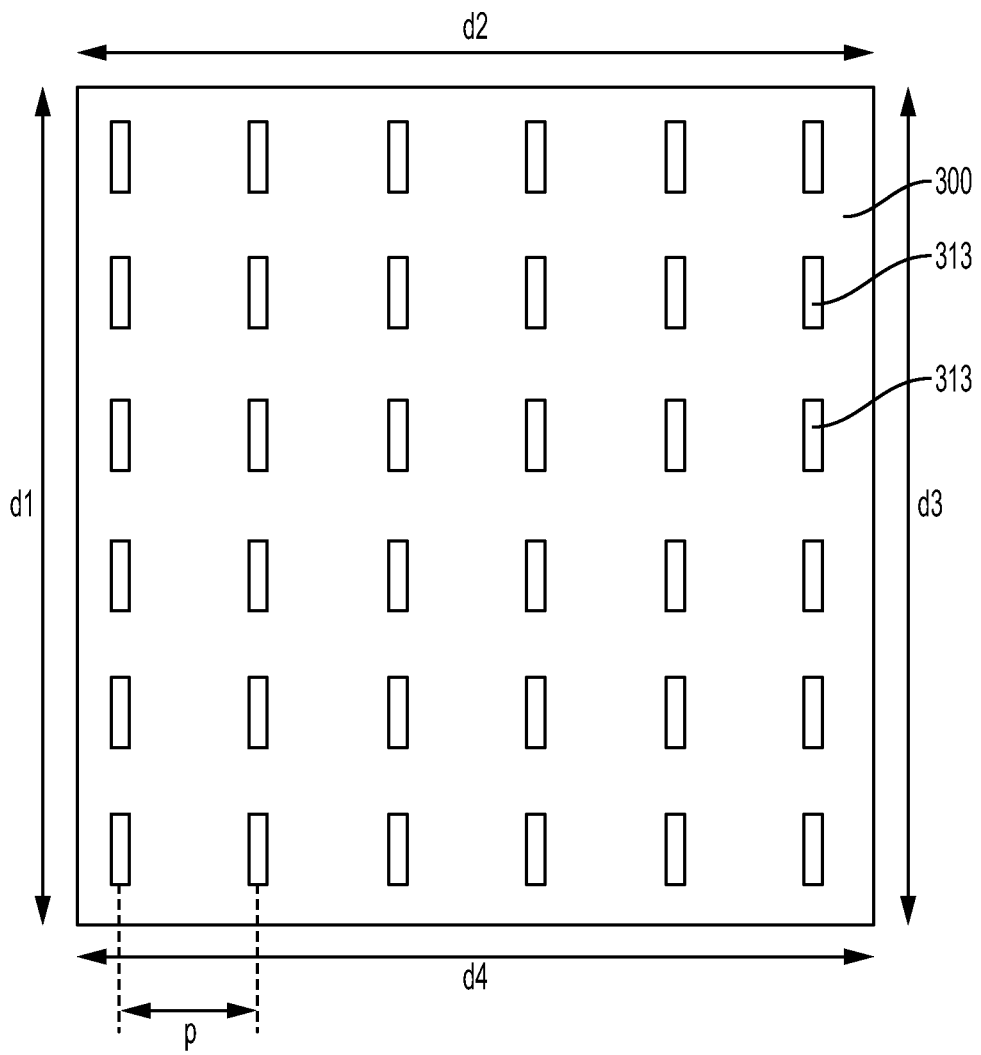
FIG. 3 depicts a view of the bottom of a chiplet showing the tips of a two dimensional array of microsprings in accordance with some embodiments.

A dense array of microsprings provides high bandwidth communication between the hardware TPM and the information processing circuitry. FIG. 3 shows the tips 313 of microsprings arranged in a two dimensional array disposed on a chiplet 300 when viewed from the surface of the chiplet that faces the chip. In various embodiments, the pitch, p, of the microspring array is in a range of about 0.5 µm to 20 µm, or in a range of about 0.5 µm to 2000 µm. The pitch may be larger than 2000 µm in some embodiments. FIG. 3 shows the distance along each circumferential edge of the chiplet. The total linear distance along the edge of the chiplet 300 is d1+d2+d3+d4.

The microspring array may be configured to provide for communication between the hardware TPM and the information processing circuitry on the chip at a bandwidth in a range of about 1 gigabit per second per layer per millimeter of linear distance along an edge of the chiplet to about 10 terabits per second per layer per millimeter of linear distance along an edge of the chiplet. The communication between the TPM and the information processing circuity could be conducted in one layer of interconnects on the chip/substrate or multiple layers of interconnects. Multiple layers provide for additional communication but fabrication costs are higher. High density, low pitch microspring arrays provide more bandwidth for each layer.

Figure 4:
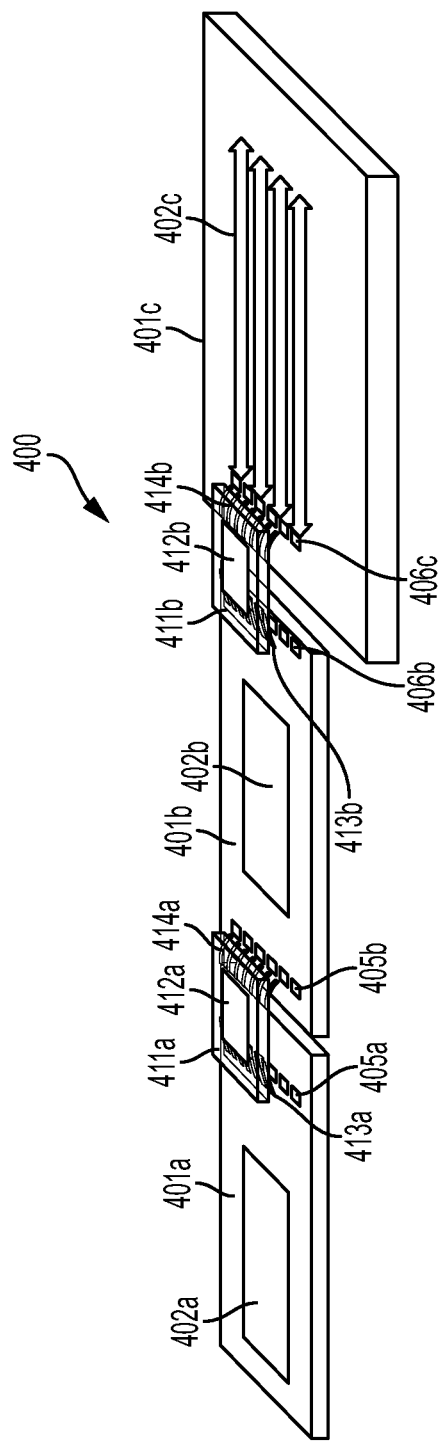
FIG. 4 shows a secured system comprising multiple semiconductor chips with microspring chiplets spanning neighboring chips in accordance with some embodiments.

Turning now to FIG. 4, in some embodiments a secured system 400 comprises a communication/encryption module configured to handle secure input/output operations. The system 400 includes three chips 401a, 401b, 401c. Chips 401a, 401b include information processing circuitry 402a, 402b. Chip 401c includes communication channel circuitry 402c. Chip 401b is disposed between and spaced apart from chips 401a and 401c.

An array of contact pads 405a, 405b includes first contact pads 405a disposed on chip 401a and electrically coupled to the first information processing circuitry 402a. Second contact pads 405b of the array 405a, 405b are disposed on chip 401b and are electrically coupled to the second information processing circuitry 402b. The chiplet 411a is arranged to bridge the space between chip 401a and chip 401b. The chiplet 411a includes microsprings 413a electrically coupled to the first contact pads 405a and microsprings 414a electrically coupled to the second contact pads 405b. The chiplet 411a includes a hardware TPM 412a that secures the operations of the first information processing circuitry 402a and the second information processing circuitry 402b. For example, chiplet 411a may secure the communications between information processing circuitry 402a on chip 401a and information processing circuitry 402b on chip 401b.

An array of contact pads 406b, 406c includes first contact pads 406b disposed on chip 401b and electrically coupled to the second information processing circuitry 402b. Second contact pads 406c of the array 406b, 406c are disposed on chip 401c and are electrically coupled to communication circuitry 402c. The chiplet 411b is arranged to bridge the space between chip 401b and chip 401c. The chiplet 411b includes microsprings 413b electrically coupled to the first contact pads 406b and microsprings 414b electrically coupled to second contact pads 406c. The chiplet 411b includes a hardware TPM 412b that secures the operations of the second information processing circuitry 402b and the communications circuitry 402c. For example, chiplet 411b may secure the communications between information processing circuitry 402b on chip 401b and communications circuitry 402c on chip 401c.

Figure 5A:
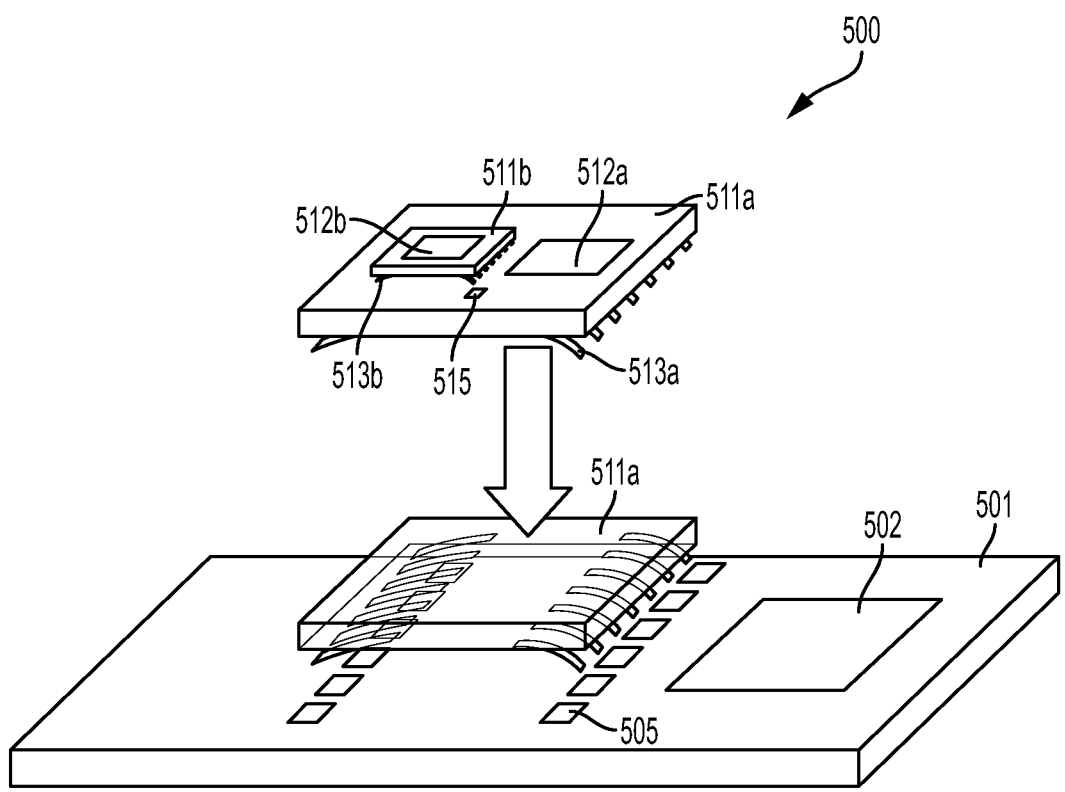
FIG. 5A illustrates a secured system which includes multiple stacked microspring chiplets in accordance with some embodiments.

FIG. 5A is a diagram of a secured system 500 that includes multiple chiplets 511a, 511b, each chiplet 511a, 511b including a portion of the hardware TPM 512a, 512b for an information processing system 502 disposed on a chip 501. The first chiplet 511a includes a first portion 512a of the hardware TPM 512a, 512b and the second chiplet 511b includes a second portion 512b of the hardware TPM 512a, 512b. For example, in some embodiments, the second portion of the hardware TPM may comprise a hash generator. An array of first contact pads 505 is disposed on the surface of the chip 501 and is electrically coupled to the information processing circuitry 502. An array of first electrically conductive microsprings 513a is disposed on the surface of the first chiplet 511a. The first microsprings 513a are electrically coupled between the first portion of the hardware TPM and the contact pads 505. An array of second contact pads 515 is disposed on a surface of the first chiplet 511a. The second contact pads are electrically coupled to the first portion of the hardware TPM 511a and/or to the first microsprings 513a. Arrays of electrically conductive second microsprings 513b are disposed on a surface of the second chiplet 511b. The second microsprings 513b are electrically coupled between the first portion of the hardware TPM and the second contact pads 515.

Figure 5B:
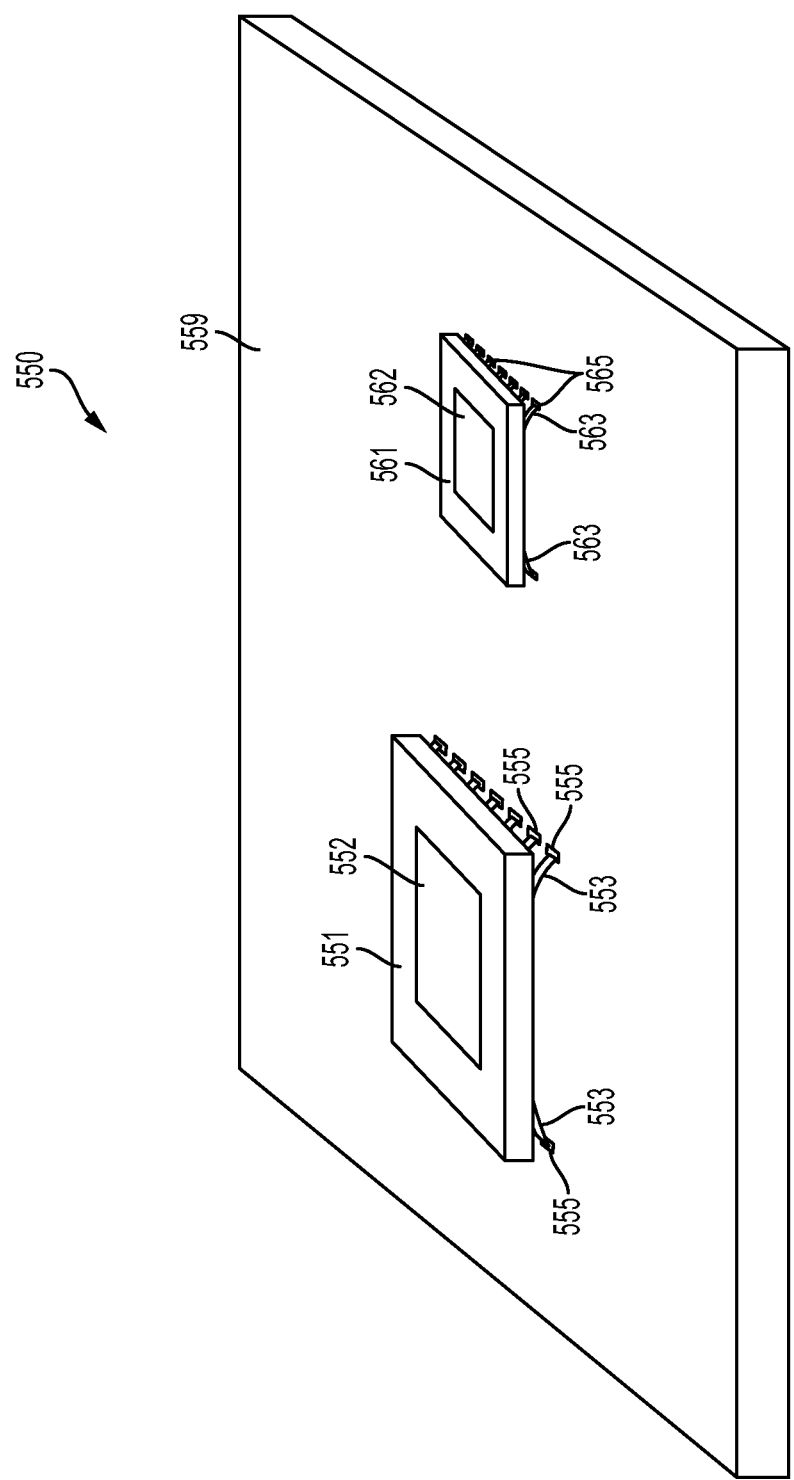
FIG. 5B shows a secured system in which a chiplet containing the information processing circuitry and a chiplet containing the hardware trusted platform module that secures operation of the information processing circuitry are disposed on the same substrate in accordance with some embodiments.

As illustrated in FIG. 5B, the chiplet 561 comprising the hardware TPM 562 may be disposed on a substrate 559 along with a chip or chiplet 551 that comprises the information processing circuitry 552 that is secured by hardware TPM 562. According to some embodiments, the substrate 559 may include only metallization layers or may include only metallization layers and passive components (resistors, capacitors) but not active components (transistors). The substrate 559 may comprise organic or inorganic materials and may be rigid or flexible. Examples of inorganic substrates include silicon, glass, inorganic polymers, etc. Examples of organic substrates include fiberglass reinforced epoxy, e.g., printed circuit board material, organic polymers, polymeric film. In some embodiments, the substrate may comprise one or more waveguides, e.g., planar waveguide, that support optical communication between the information processing chip and the hardware TPM chiplet.

FIG. 5B illustrates a secured system 550 having a first chiplet 551 that includes information processing circuitry 552 and a second chiplet 561 that includes a hardware TPM 562 that secures the information processing circuitry 552. Both chiplets 551, 561 are disposed on the same substrate 559. The hardware TPM 562 and the information processing circuitry 552 can be configured to communicate through electrical and/or optical interconnects on substrate 559. One or both chiplets 551, 561 may be attached to the substrate 559 using microsprings 553, 563 as shown in FIG. 5B. FIG. 5B illustrates a scenario in which both chiplets 551, 561 include microsprings 553, 563 that are attached to contact pads 555, 565 on the substrate 559. In alternative implementations, the chip or chiplet comprising the information processing circuitry may be attached to the substrate by a non-removable mechanism. In some scenarios, the information processing chip or chiplet cannot be removed from the substrate without damage to the substrate and/or the information processing chip/chiplet, whereas the chiplet containing the hardware TPM is removable.

Figure 5C:
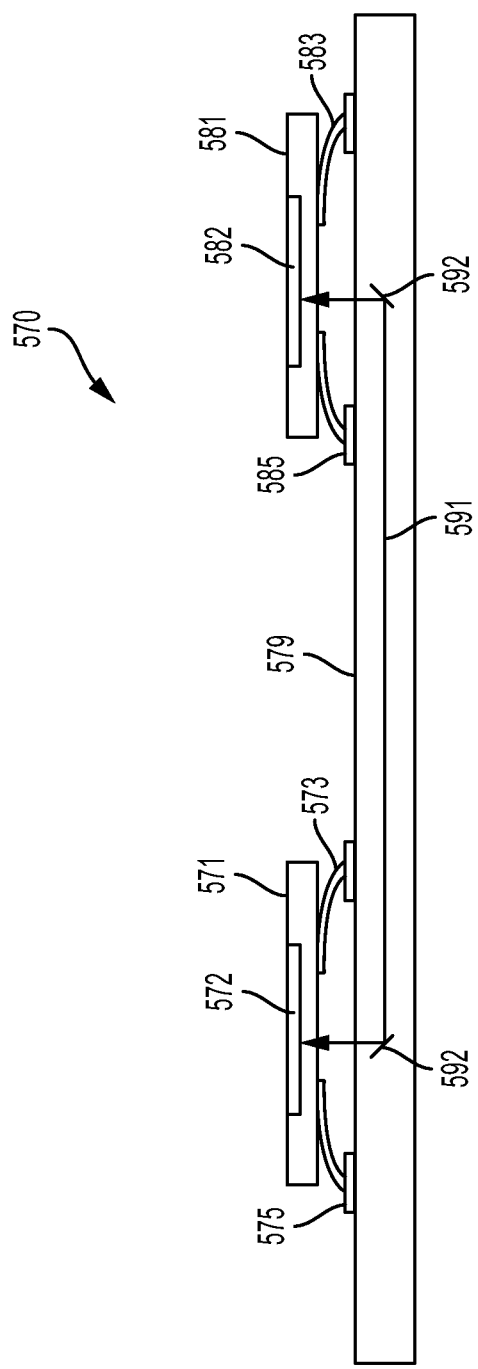
FIG. 5C shows a secured system in which a chiplet containing the information processing circuitry and a chiplet containing the hardware trusted platform module that secures operation of the information processing circuitry are disposed on an optical substrate in accordance with some embodiments.

FIG. 5C illustrates a secured system 570 having a first chiplet 571 that includes information processing circuitry 572 and a second chiplet 581 that includes a hardware TPM 582 that secures the information processing circuitry 572. One or both chiplets 571, 581 may include microsprings 573, 583 attached to contact pads 575, 585 on the substrate 579. As shown in FIG. 5C, both chiplets 571, 581 are disposed on the same substrate 579. In this example, the substrate 579 is an optical substrate which is or comprises at least one optical waveguide. The hardware TPM 582 and the information processing circuitry 572 can be configured to communicate through electrical interconnects on the substrate 579 and/or through the optical communication channel provided by optical components on the information processing chiplet 571 and the hardware TPM chiplet 581. Optical communication signals, indicated by arrow 591, travel through one or more optical waveguides of optical substrate 579 between the optical components on the information processing chiplet 571 and the hardware TPM chiplet 581. The optical communication signal may be directed, reflected, focused, or otherwise controlled by one or more optical components 592 disposed in or on the substrate 579.

Figure 6:
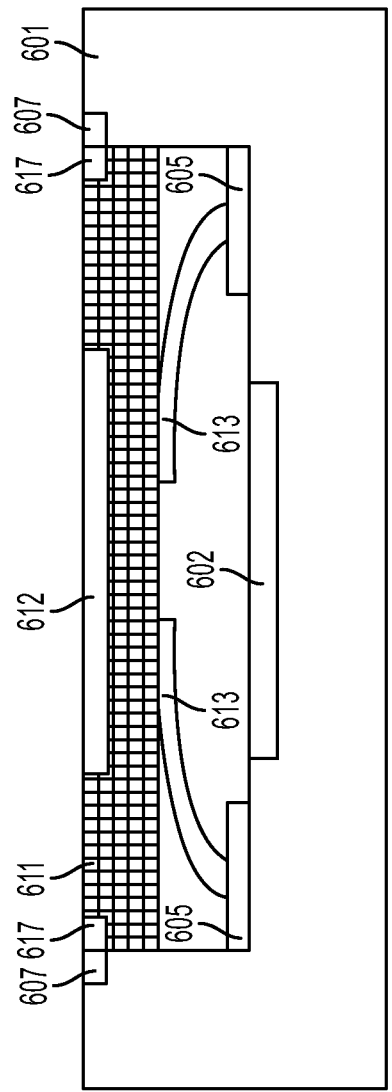
FIG. 6 is a diagram illustrating a secured system comprising a chip and chiplet having optical devices that provide optical communications between the chip and chiplet in accordance with some embodiments.

Turning now to FIG. 6, some embodiments involve optical communication between the information processing circuitry disposed on a chip and the hardware TPM disposed on a chiplet. According to the embodiment of FIG. 6, a secured system 600 comprises a chip 601 that includes information processing circuitry 602 and a chiplet 611 that includes a hardware TPM 612 that secures the information processing circuitry 602. The chip 601 and chiplet 611 include optical communication components 607, 617 configured to support optical communications between the information processing circuitry 602 and hardware TPM 612. In addition to the optical signals supported by the optical communication components 607, 617, microsprings 613 and contact pads 605 of the system 600 may optionally be used to provide for electrical communication signals between the information processing circuitry 602 and the hardware TPM 612 and/or may be used to provide power and/or ground to the hardware TPM 612. The microsprings 613 and contact pads 605 may be soldered, welded, or epoxied together to mechanically stabilize the chiplet 611 on the chip 601. In some embodiments, the microsprings and contact pads may be replaced with solder bumps, e.g., a ball grid array or other type of electrical contacts, between the chiplet 611 and chip 601. In embodiment shown in FIG. 6, at least some communication between the TPM 612 on chiplet 611 and the information processing circuitry 602 on chip 601 occurs through a reusable optical connection channel formed by communication components 607, 617 rather than one enabled by microsprings 613.

Fabrication of complex circuitry in silicon (or other semiconductors) is expensive. Fabricating a chip or chiplet with complex circuitry may involve deposition of many metal levels, e.g., ten or more, and may require hundreds of sequenced processing steps. It can cost tens or hundreds of millions of dollars to create the master fabrication tool used to produce the circuitry for many chips or chiplets. Because it is so expensive to produce the fabrication tool, it is generally more cost effective to produce a number of hardware TPMs on one chiplet that can cryptographically secure multiple types of information processing circuitry. This approach shares the initial fabrication cost over several hardware TPMs on one chiplet rather than incurring the initial fabrication cost of each hardware TPM on separate chiplets. When multiple hardware TPMs are present on a chiplet, each of the hardware TPMs can be used to cryptographically secure operations of a different type of information processing circuitry.

Figure 7:
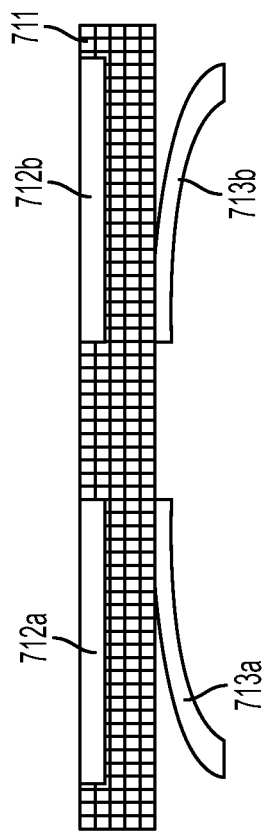
FIG. 7 is a diagram illustrating a chiplet that contains multiple hardware trusted platform modules in accordance with some embodiments.

For example, as shown in FIG. 7, a chiplet 711 can include multiple hardware TPMs 712a, 712b. The first hardware TPM 712a is electrically coupled to the first microsprings 713a and is not electrically coupled to the second microsprings 713b. The second hardware TPM 712b is electrically coupled to the second microsprings 713b and is not electrically coupled to the first microsprings 713a. The chiplet 711 may be placed on a chip that includes information processing circuitry (not shown in FIG. 7) such that the correct microsprings 713a, 713b are coupled to the contact pads of the chip according the type of information processing circuitry included in the chip. For example, the first hardware TPM 712a on the chiplet 711 may be compatible to cryptographically secure the information processing circuitry of the chip upon which the chiplet 711 is mounted. The second hardware TPM 712b may be incompatible with the information processing circuitry of the chip upon which the chiplet 711 is mounted.

Figure 8:
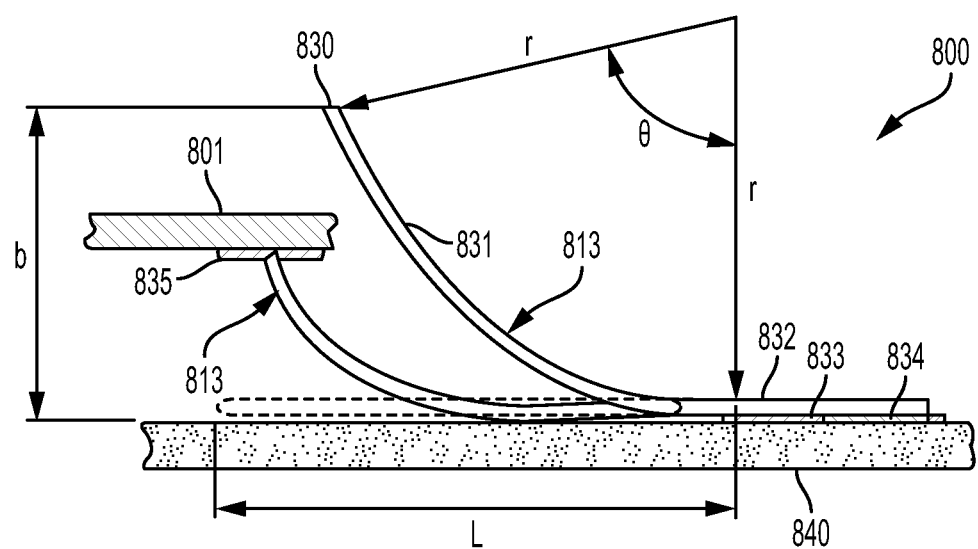
FIG. 8 is a microspring in a free state and another microspring deformed when contacting a contact pad in accordance with some embodiments

FIG. 8 shows a side view of a portion of a structure 800 that includes a plurality of microsprings 813. Each microspring 813 comprises a free portion 831 and an anchor portion 832 fixed to an underlayer or release layer 833 and electrically connected to a contact pad 834. Each microspring 813 is made of an elastic material, such as a chrome, molybdenum alloy or a nickel-zirconium alloy. According to some embodiments, the microsprings 813 are formed of an elastic conductive material, although they can be formed of a non-conductive or semi-conductive material if they are coated or plated with a conductor material. According to some embodiments, the microsprings 813 are formed of a nickel-zirconium alloy having 1% zirconium. Zirconium may be added to the alloy to improve the elastic properties of the alloy while not greatly affecting the conductivity of the alloy. When the elastic material is not conductive, it is coated on at least one side with a conductive material, such as a metal or metal alloy.

The contact pad 834 can be the terminal end of a communication line which electrically communicates with an electronic device formed on the substrate 840. The contact pad 834 is typically made of aluminum, but can be made of any conductive material. The release layer 833 can be made of silicon nitride, Si, Ti or other etchable material. However, the release layer 833 is not necessary and can be eliminated. The release layer 833 and the contact pad 834 are formed on or over a substrate 840, which is formed of a material, such as oxidized silicon or glass or ceramic or silicon or gallium arsenide or other semiconductor.

Figure 9A:
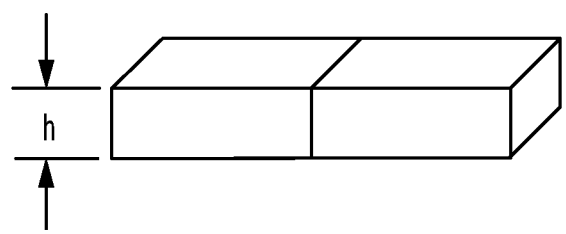
FIG. 9A shows a metal strip with no stress gradient.

As shown in FIG. 9A, a strip of metal having no stress gradient inherent in the metal will lie flat. However, as shown in FIG. 9B, when a uniform stress gradient is introduced into the strip of metal, the strip bends into an arc.

Figure 9B:
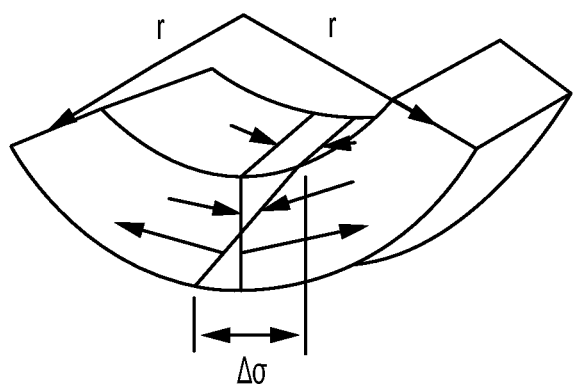
FIG. 9B shows a model for determining the curvature of a microspring due to the stress gradient.

Each spring contact 813 is formed such that the stress gradient shown in FIG. 9B is introduced into the spring contact 813. When the spring contact 813 is formed, the metal layer comprising the spring contact 813 is deposited such that compressive stress is present in lower portions of the metal layer and tensile stress is present in upper portions of the metal layer. FIG. 9B shows the stress difference $\Delta\sigma$ (i.e., the difference in stress from the top to the bottom) present in the spring contact 813. Compressive stress in lower portions of the metal layer is depicted by arrows directed to the left. Tensile stress is depicted in upper portions of the metal layer by arrows directed to the right. The stress gradient (stress difference divided by thickness) causes the spring contact 813 to bend into the shape of an arc having a radius r.

Since each spring contact 813 is preferably made of an elastic material, each spring contact 813 can be pushed down at the tip 830 and deformed as shown in FIG. 8, but will not plastically deform. Typically, a contact pad 835 of a device 801 exerts the downward force placed on the tip 830 and electrically contacts the tip 830. The spring contact 813 resists the downward force placed on the tip 830 and maintains electrical contact with the contact pad 835.

When the force on the tip 830 is released, the spring contact 813 will return to its undeformed state. Thus, the elasticity of the spring contacts 813 allows the spring contacts to make numerous electrical connections with different contact pads 835 while maintaining the integrity of the electrical connection between the spring contact tip 830 and the contact pads 835.

Additionally, the spring contact 813 is preferably made of a creep resistant material. Therefore, when the spring contact 813 is elastically deformed over an extended period by a contact pad 3 pressing down on the spring contact tip 830, the spring contact 813 resists the downward force and pushes the spring contact tip 830 against the contact pad 834, maintaining the electrical connection.

Figure 10:
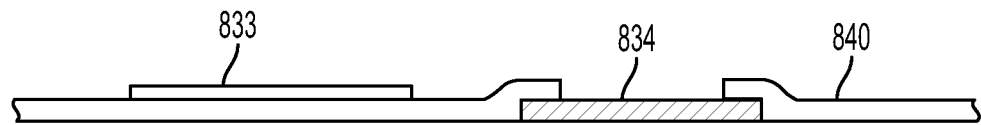
FIGS. 10 through 13 illustrate a process for forming microsprings in accordance with some embodiments.

FIGS. 10-13 show the basic steps in one method for forming a spring contact 813. In FIG. 10, a contact pad 834 is formed on or over a substrate 840. Additionally, a release layer 833 is formed on or over the substrate 840. However, as mentioned above, the release layer 833 is not required and can be eliminated.

Figure 11:
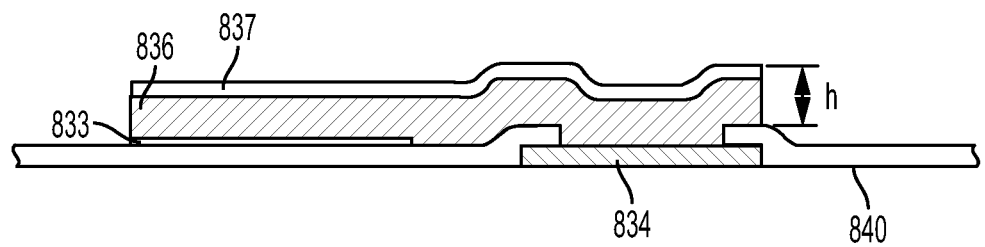

In FIG. 11, a layer of metal 836 is deposited on or over the substrate 840. In the preferred embodiment of the invention, the metal is the nickel-zirconium alloy described above. Part of the metal layer 836 is electrically connected to or directly contacts the contact pad 833 and another portion of the metal layer 836 is deposited on or over the release layer 833. There are many methods available for depositing a metal layer 836 on or over the substrate 840, including electron-beam deposition, molecular beam epitaxy, chemical vapor deposition and sputter deposition. Preferably, the metal layer 836 is sputter deposited.

When sputter depositing a metal, the metal to be deposited is placed on a target and set to a high negative voltage. A stream of plasma gas, typically argon, is died towards the target. The high voltage potential between the plasma gas and the target metal produces ions which are accelerated toward and bombard the metal target. This bombardment knocks small particles of the metal target free and the freed particles are guided to the surface where the particles are deposited.

The metal layer 836 is deposited in several sub-layers 836-1 to 836-$n$ to a final thickness h of approximately 1 µm. The stress difference $\Delta\sigma$ is introduced into the metal layer 836 by altering the stress inherent in each of the sub-layers 836-1 to 836-$n$ of the metal layer 836, as shown in FIG. 11, each sub-layer 836-$x$ having a different level of inherent stress.

Different stress levels can be introduced into each sub-layer 836-$x$ of the deposited metal layer 836 during sputter deposition in a variety of ways, including adding a reactive gas to the plasma, depositing the metal at an angle, or varying the deposition angle, and changing the pressure of the plasma gas. Preferably, the different levels of stress are introduced into the metal layer 836 by varying the pressure of the plasma gas, which is preferably argon.

The process of depositing the metal layer 836 in five separate sub-layers 836-1 to 836-5 results in the metal layer 836 having a stress difference $\Delta\sigma$ which is compressive in the lower portion of the metal layer 836 and becomes increasingly tensile toward the top of the metal layer 836. Although the stress gradient urges the metal layer 836 to bend into an arc, the metal layer 836 adheres to the release layer 833, the substrate 830 and the contact pad 833 and thus lies flat.

Figure 12:
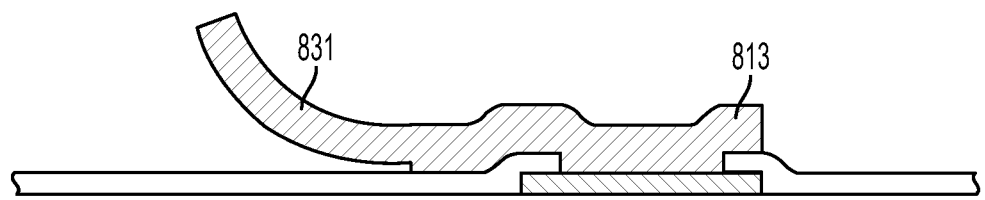
Figure 13:
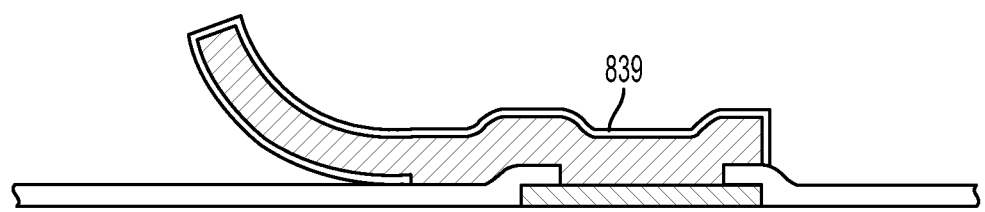

After the metal layer 836 is deposited, the metal layer 836 is photolithographically patterned into the spring contacts 813. Photolithographic patterning is a well-known technique and is routinely used in the semiconductor chip industry. Photolithographically patterning the metal layer 836 is completed generally as shown in FIGS. 11-13. A photosensitive material 837 is evenly deposited on the top surface of the metal layer 836. The photosensitive layer 837 is then soft-baked at a temperature of approximately 120 degrees F. The photosensitive layer 837 is then exposed to light, typically in the ultra-violet spectrum. Using an appropriate mask. The mask ensures that areas of the photosensitive material 837 are appropriately exposed to the light which describes a two-dimensional view of the microspring contacts 813.

Once the photosensitive material 837 is exposed to the appropriate pattern of light, the photosensitive material 837 is developed and hard-baked at a temperature of approximately 200 degrees F. The elastic material 836 is then etched to form the spring contacts 813. Different methods for etching can be used, including ion milling, reactive ion etching, plasma etching and wet chemical etching. Preferably, wet chemical etching is used.

Figure 14:
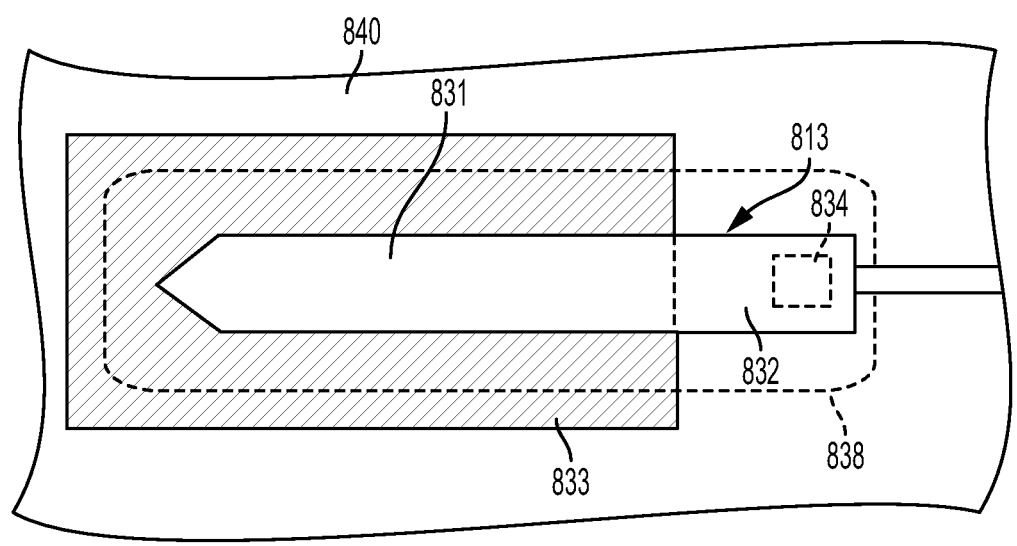
FIG. 14 is a top view of a microspring before release in accordance with some embodiments.

The wet chemical etchant, for example, a nitric acid solution, is applied to the elastic material 16. The etchant removes appropriate areas of the photosensitive material 837, determined by which areas of the photosensitive material 837 were exposed or not exposed to the light and the type of photosensitive material 837 used. When the appropriate areas of photosensitive material 837 are removed, the etchant removes the areas of the metal layer 836 lying under the removed areas of photosensitive material 837. The remaining areas of the metal layer 836 form the spring contacts 813. A top-view of one spring contact 813 is shown in FIG. 14. The area of the metal layer 836 removed by the etchant is described by the dashed line 838.

Next, as shown in FIG. 12, the free portion 831 of the spring contact 813 is released from the release layer 833 by a process of under-cut etching. Until the free portion 831 is released from the release layer 833, the free portion 831 adheres to the release layer 833 and the spring contact 813 lies flat on the substrate 840. A second layer of the photosensitive material 837 is deposited on top of the spring contacts 813 and on the area surrounding the spring contacts 837. The second layer of the photosensitive material 837 is then exposed to light using the appropriate mask, developed and hard-baked. A selective etchant is then applied to the photosensitive material 837 and removes areas of the photosensitive material 837 around the spring contacts 813. The etchant is called a selective etchant because after the areas of photosensitive material 837 around the spring contacts 813 are removed, the etchant proceeds to etch the release layer 833 underneath the spring contacts 813. The photosensitive material 837 on top of the spring contacts 813 resists the selective etchant and protects the spring contacts 813. The selective etchant etches the release layer 833 faster than the selective etchant removes metal from the spring contacts 813. This means that the spring contacts 813 are released from the release layer 833 and are allowed to bend up and away from the release layer 833 due to the stress gradient in the spring contacts 813.

Only those areas of the release layer 833 under the free portion 831 of the spring contact 813 are undercut etched. The area of release layer 833 under-cut etched for each spring contact 813 is described by the shaded portion in FIG. 14. This means that the anchor portion 832 of the spring contact 813 remains fixed to the release layer 833 and does not pull away from the release layer 833. It should be appreciated that the method for patterning the metal layer 836 onto the spring contacts 813 should not result in any annealing of the metal layer 836.

Once the free portion 831 is freed from the release layer 833, the stress gradient causes the free portion 831 to bend up and away from the substrate 840. The stress lent is still inherent in the anchor portion 832 and urges the anchor portion 832 to pull away from the substrate 840.

To decrease the chance of the anchor portion 832 pulling away from the substrate 840, the spring contact 813 can be annealed to relieve the stress in the anchor portion 832. This annealing process does not affect the free portion 831 because, once the free portion 831 is released and allowed to bend up, no stress remains on the free portion 831 to be relieved by annealing. Thus, the stress gradient remains in the free portion 831, and the free portion 831 remains curved up and away from the substrate 840 after annealing.

Finally, FIG. 13 shows a layer of gold 839 plated over the outer surface of each spring contact 813. The layer of gold 839 is preferably used to reduce the resistance in the spring contacts 813, but can be replaced with any other conductive material. Preferably, the gold layer 839 is plated on the spring contacts 813 using a plating process.

Additional steps can be added to the undercut etching process to improve the process if necessary. For example, etchant vias, or small windows, can be etched into the free portions 831 of the spring contacts 813. The etchant vias operate to provide the selective etchant faster access to the release layer 833, thereby speeding the process of releasing the free portions 831 from the release layer 833. Also, a hard mask can be applied to the top surface of the spring contacts 813 to ensure that the selective etchant does not remove material from the top surface of the spring contacts 813 in case the photosensitive material 837 protecting the top of the spring contacts 813 fails.

Since the process for forming the spring contacts 813 is limited only by the design rules of photolithographic patterning, many hundreds or thousands of spring contacts 813 can be formed closely together in a relatively small area on the substrate 840. In some embodiments, the width of the spring contacts 813 may be about 0.5 µm and the spring contacts 813 can formed close together. In some implementations, the center-to-center distance between adjacent spring contacts 813 may be about 1 µm. Additional information about microsprings suitable for the systems and devices described herein and methods for making such microsprings are described in commonly owned U.S. Pat. Nos. 6,856,225 and 8,519,534 which are incorporated herein by reference.

Figure 15:
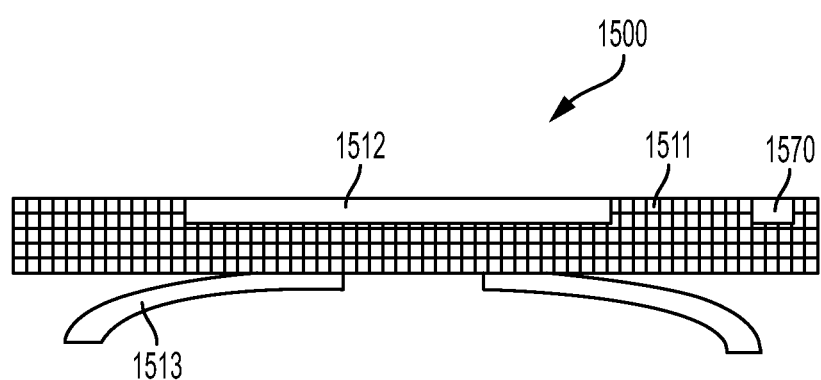
FIG. 15 is a diagram of a secured system that includes a tamper detection circuit in accordance with some embodiments.

Hardware TPMs can be compromised by tampering and it is desirable to have the ability to detect any tampering attempts. FIG. 15 shows a chiplet 1511 with microspring contacts 1513. The chiplet 1511 includes a hardware TPM 1512 and a tamper detection element 1570 configured to indicate if there has been an attempt to tamper with the chiplet 1511. The tamper detection element 1570 can include seals, break once links, and/or films that indicate changes caused by tampering. In some embodiments, the tamper detection element 1570 comprises tamper detection circuitry 1570 which includes a sensor configured to detect one or more of light, x-rays, vibration, chemical exposure, electrical properties and/or other environmental parameters indicative of tampering. The secured system, e.g., the information processing circuitry or hardware TPM, may cause any information stored in the hardware TPM to be destroyed if tampering is detected. In some embodiments, the secured system may be rendered inoperable in response to detection of a tampering event.

According to some embodiments, the tamper detection circuitry is configured to passively detect environmental parameters indicative of tampering, e.g., such as air, humidity, light, x-rays, electrical properties and/or chemicals. The passive detectors discussed herein are capable of storing data indicating exposure of the detector to a threshold change in the environmental parameter(s) of interest. Embodiments discussed herein can be implemented to provide a low cost and reliable approach for detection of tampering attempts.

Figure 16A:
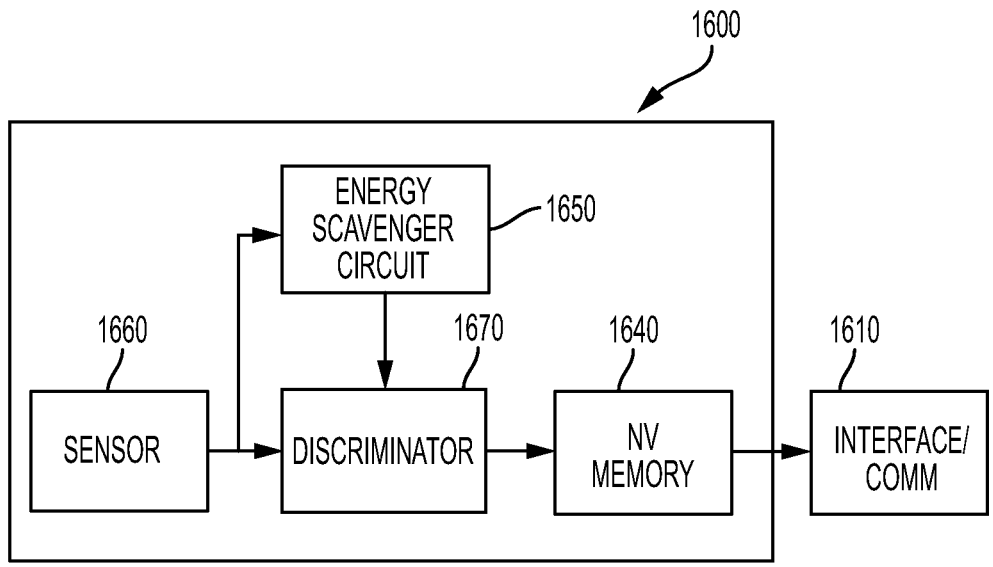
FIG. 16A is a block diagram of a passive detector implemented with one nonvolatile memory cell in accordance with some embodiments.

FIG. 16A is a block diagram of a passive detector 1600 in accordance with some embodiments. The passive detector 1600 is configured to detect an environmental parameter of interest and to store data indicating exposure to a configuration of the environmental parameter. The passive detector 1600 is capable of detecting the environmental parameter and storing the encrypted data without being connected to an active source of power such as a power supply, battery, or other energy storage/power generation device.

The passive detector 1600 includes at least one sensor 1660 configured to sense an environmental parameter of interest and to generate an electrical output signal in response to the presence of the sensed environmental parameter. An energy scavenger circuit 1650 coupled to the sensor 1660 boosts the relatively weak output signal level of the sensor 1660 to a higher signal level. For example, the energy scavenging circuit 1650 may boost a first voltage having a first voltage value, $V_1$, present at the output of the sensor 1660 to a second voltage having second voltage value, $V_2$, where $V_2 > V_1$.

A discriminator 1670 includes an input coupled to the output of the sensor 1660 and is powered by the output of the energy scavenging circuit 1650. The signal level of the sensor output is dependent on the presence and/or configuration of the sensed environmental parameter. The discriminator 1670 is configured to compare the output signal of the sensor 1660 to a threshold level and, in response to the sensor output signal being beyond the threshold level, to provide an encrypted programming signal to a nonvolatile memory 1640, e.g. a single nonvolatile memory cell as shown in FIG. 16A. The programming signal has a level sufficient to store or erase data stored in the nonvolatile memory. Although generally described herein as flash memory, suitable types of nonvolatile memory include but are not limited to: floating gate (flash) memory, such as NAND and NOR flash, phase change memory (PCM), resistive random access memory RRAM, and magnetic random access memory MRAM.

In some scenarios, the level of the sensor output signal may decrease in response to the presence of the environmental parameter and, in these scenarios, the programming signal is provided by the discriminator when the sensor output signal decreases below the threshold level. In other scenarios, the level of the sensor output signal may increase in response to the presence of the environmental parameter and, in these scenarios, the programming signal is provided by the discriminator when the sensor output signal increases above the threshold level.

In some implementations, storage of data in the nonvolatile memory 1640 may be triggered by exposure to a threshold dose of the environmental parameter. The exposure dosage of an environmental parameter is a function of both the amount of the environmental parameter and the amount of time of the exposure. Thus, exposure dosage can indicates exposure to a cumulative amount of the environmental parameter over a period of time.

The threshold level may be selected such that an expected amount of exposure or cumulative exposure dosage to the environmental parameter does not cause a change in the memory state of the nonvolatile memory. For example, the passive detector may be configured so that an x-ray dose when intentionally passing airport security check point will not trigger storage of the data whereas a single one time computed tomography (CT) scan will trigger the data storage.

The passive detector 1600 may optionally be coupled to interface and/or communication circuitry 1610. The interface/communication circuitry 1610 is configured allow the memory state of the nonvolatile memory 1640 to be read. The interface/communication circuitry can be configured to communicate with an external device, e.g., to transfer the stored data and/or other information such as an identification code for the passive detector 1600 to an external device. In some implementations, power to operate the interface/communications circuitry 1610 is provided inductively by a wireless interrogator, e.g., such as a radio frequency identification (RFID) interrogator. In some implementations, external power is applied directly to at least the nonvolatile memory and/or interface/communication circuitry to read the data stored in the memory cells.

In some embodiments, the passive detector may be configured to detect the presence of an environmental parameter within subranges of the environmental parameter. As one example, the passive detector may use an x-ray sensor configured to discriminate and/or be sensitive to a particular band of x-rays. Similar to a single photon counting instrument, each x-ray photon incident on the x-ray sensor generates a pulse of output signal wherein the amplitude of the output signal is proportional to the x-ray photon energy. In some embodiments, the discriminator may be configured to resolve the high frequency pulse train from the x-ray sensor and to use the pulse amplitude information to identify the type of x-ray exposure.

As another example, the sensor may comprise an acoustic/vibration sensor and the discriminator may be configured to determine frequency components of the vibration in the sensor output signal. The discriminator may be configured to determine if the event should be recorded in the nonvolatile memory based on the frequency components of the vibration.

Returning now to FIG. 16A, in some embodiments, the nonvolatile memory 1640 comprises one nonvolatile memory cell, e.g., one flash memory cell based on floating gate technology. When the environmental parameter sensed by the sensor 1660 is beyond the threshold of the discriminator 1670, the discriminator 1670 provides a programming signal to the memory cell 1640 having a level sufficient to change the memory state of the memory cell. For example, the programming signal provided at the output of the discriminator 1670 is capable of changing the state of the memory cell 1640 from a first state, e.g., an erased or binary "1" state, to a second state, e.g., programmed state or binary "0" state. In some implementations, the programming signal may be capable of changing the state of the memory cell from the first state to the second state and may not be capable of changing the state of the memory cell 1640 from the second state to the first state. For example, a diode or other circuit component may be included at the output of the discriminator 1670 to provide this feature. In such an implementation, the memory cell 1640 is restricted to "write only mode" or "erase only mode," which enhances data integrity.

The nonvolatile memory 1640 may comprise one single level memory cell capable of storing one bit of data. In this configuration, the presence of the environmental parameter of interest beyond the threshold level changes the state of the memory cell. For example, the memory cell 1640 may initially be in a first state, e.g., an erased state. When the detector 1600 is exposed to the environmental parameter equal to or beyond the threshold level, the programming signal output by the discriminator 1670 operates to cause the memory cell 1640 to change state from the first (erased) state to a second (programmed) state. Thus, data stored in one single level memory cell can provide information about whether or the sensor has been exposed to at least the threshold level of the environmental parameter (wherein the threshold level may involve both amount of environmental parameter and time of exposure) but the single data bit cannot provide additional information about an amount of exposure or dosage (amount of time and level) of exposure of the sensor 1660 to the environmental parameter.

In some embodiments, the nonvolatile memory 1640 may comprise a multiple level memory cell capable of storing multiple bits of data in one cell, e.g., two bits, three bits or more bits of data. A multiple level cell can provide information about the exposure of the sensor to the environmental parameter relative to multiple threshold levels. For example, consider a two bit memory cell which can store data values 00, 01, 10, or 11. In this scenario, data value 11 may indicate no exposure to the environmental parameter, and data values 10, 01, 00 may indicate low, medium, and high exposure levels. In general, it is beneficial if the data is encrypted and sent encrypted to other remote locations so that the information cannot be replicated.

Figure 16B:
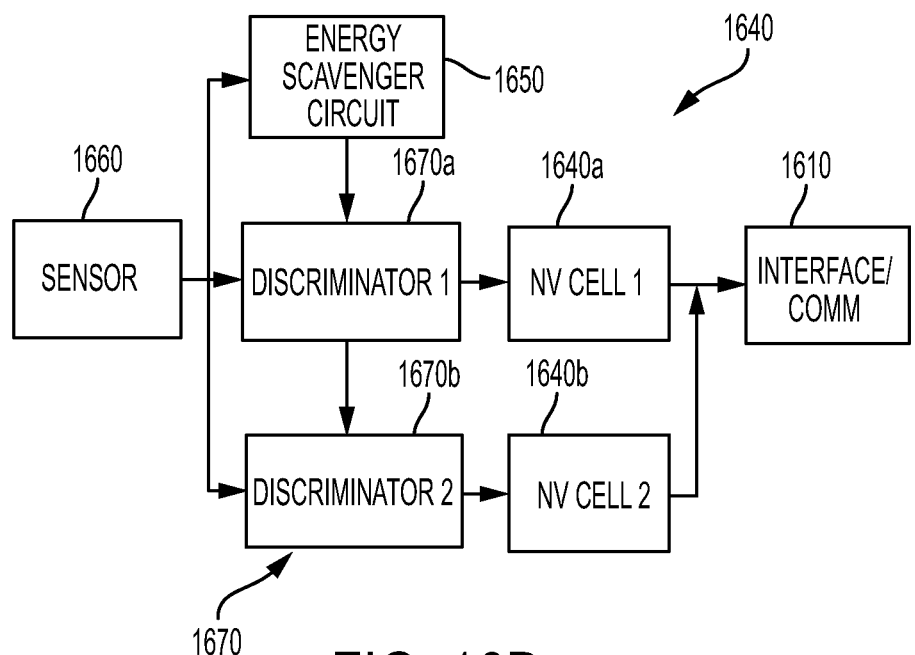
FIG. 16B is a block diagram of a passive detector implemented with multiple nonvolatile memory cells in accordance with some embodiments.

As shown in FIG. 16B, in some embodiments, the nonvolatile memory 140 may include multiple memory cells 1640a, 1640b, each memory cell capable of storing one or more bits of data. Each memory cell 1640a, 1640b has a different threshold level respectively controlled by discriminator elements 1670a, 1670b of discriminator 1670. In the embodiment illustrated by FIG. 16B, each of the memory cells 1640a, 1640b may be capable of storing one bit of data such that the memory device is capable of representing up to four distinct values. In one scenario, when both NV memory cells 1640a, 1640b are in the 1 state, this indicates that the environmental parameter is not present or is present at a level below the first threshold level of discriminator 1; the first NV memory cell in state 0 and the second NV memory cell in 1 state indicates that the environmental parameter is present at a level greater than the threshold level of discriminator 1, but less than the threshold level of discriminator 2; both the first NV memory cell and the second NV memory cell at state 0 indicates that the environmental parameter is present at level equal to or greater than the threshold level of discriminator 2.

Figure 16C:
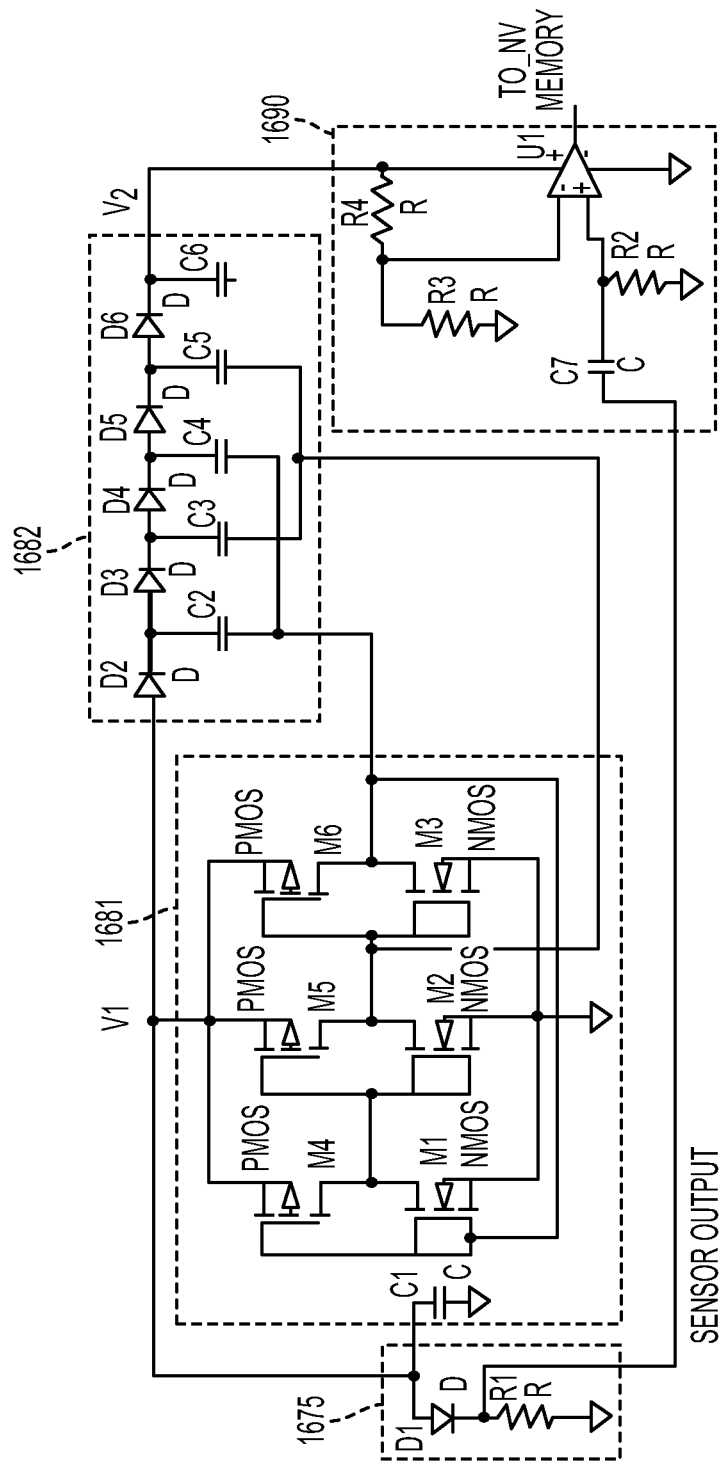
FIG. 16C is a circuit diagram of a passive detector in accordance with some embodiments.

FIG. 16C is a schematic diagram of a portion of a passive detector in accordance with some embodiments. The portion shown in FIG. 16C illustrates a portion of a sensor 1675 which in this example is described as an x-ray sensor, an energy scavenging circuit 1680 comprising circuit components 1681 and 1682, and discriminator 1690. X-ray photons hit a scintillator and generate light pulses whose amplitude is proportional to the energy of the x-ray photon. The light pulses are sensed by photodiode D4 which converts the light energy to a current. The accumulated charge and energy is stored in capacitor C1, where $V_1$ is the voltage across the sensor 1675 at capacitor C1 as shown in FIG. 16C. The voltage, $V_1$, generated at capacitor C1 due to current generated by the sensor 1675 causes the ring oscillator 1681 to oscillate. The oscillation generated by the ring oscillator 1681 drives the charge pump 1682 to generate a second voltage, $V_2$, at capacitor C6 that is greater than photodiode D1 open circuit voltage, and greater than $V_1$. The energy stored in capacitor C6 is used to power an operational amplifier-based discriminator 1690. The sensor 1675 generates a pulsing voltage at the sensor output across resistor R1 in response to x-ray photons. The pulsing voltage at R1 is capacitively coupled to the input of the operational amplifier U1 of discriminator 190 through capacitor C7. The operational amplifier U1 compares the level of the voltage pulses at the + input to the threshold level which is determined by resistors R4 and R3. If the level of the pulses is higher than the threshold level, the output of the operational amplifier U1 is sufficient to change the state of the NV memory (not shown in FIG. 16C).

In some scenarios, a passive detector can include interface circuitry that logically ORs the outputs of the nonvolatile memory cells. The output of the logical OR provides information about whether or not an environmental event occurred, but does not provide information about the type of environmental parameter that was sensed. In some scenarios, the outputs of the discriminators may be logically ORed with the result stored in a single nonvolatile memory cell.

In some embodiments, the interface/communication circuitry coupled to the passive detector is capable of establishing a wired or wireless communication link with an interrogator or other external system and is configured to transfer the data stored in the NV memory over the communication link when interrogated. In some embodiments, the passive detector communicates using radio frequency identification (RFID) communication technology. RFID communication technology wirelessly transfers data by magnetic fields over short distances by electromagnetic induction. The interrogator generates an electromagnetic field that inductively couples with the communication circuitry of the passive detector such the communication circuitry coupled to the passive detector operates as a passive transponder. RFID communication allows the communication circuitry to use energy from the interrogator signal to passively communicate the detector status. In other embodiments, power may be applied to the communication circuitry and/or NV memory allowing the NV memory to be interrogated by an external circuit. When powered is supplied for interrogation, wired or wireless communication between the passive detector and the external circuit can span many meters.

Figure 17:
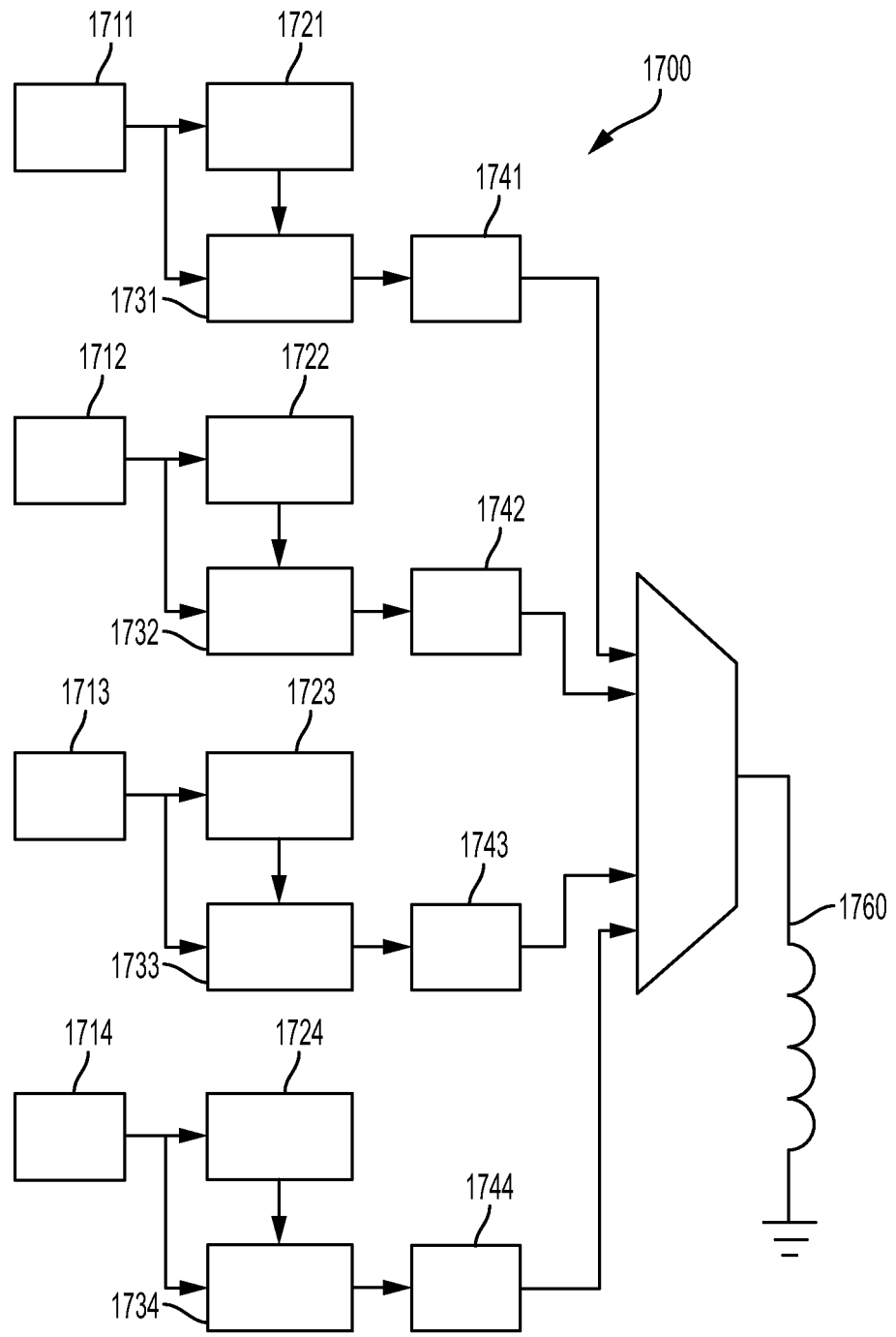
FIG. 17 illustrates an exemplary passive detector that uses four different sensor types to detect the occurrence of different environmental parameters in accordance with some embodiments.

FIG. 17 illustrates an exemplary passive detector 1700 that uses four different sensor types to detect the presence of four different types of environmental parameters. Passive detector 1700 includes a light sensor 1711 comprising a PIN diode, an x-ray sensor 1712 comprising a PIN diode with a scintillation layer, a chemical sensor 1713, and a vibration sensor 1724. Each sensor 1711, 1712, 1713, 1714 generates an electrical signal at its output in response to the presence of a sensed environmental parameter. Each of the sensor outputs are coupled to an energy scavenger circuit 1721, 1722, 1723, 1724 and to a discriminator 1731, 1732, 1733, 1734. The energy scavenger circuits 1721, 1722, 1723, 1724 are configured to provide power to the discriminators 1731, 1732, 1733, 1734 and can provide power to the nonvolatile memory for writing the data into the nonvolatile memory. In some embodiments, power to read the nonvolatile memory may be supplied by external circuitry.

The outputs of the discriminator are coupled respectively to an input of a flash memory cell 1741, 1742, 1743, 1744. The outputs of the memory cells 1741, 1742, 1743, 1744 are coupled to interface circuitry 1750. In some embodiments, the interface circuitry 1750 is powered by an external circuit. The interface circuitry 1750 may be configured to read the ORed result of each memory cell and/or may be configured to read each memory cell individually. The passive detector 1700 may include communication circuitry which is based on RFID technology comprising a coil 1760 configured to facilitate communication with an interrogator (not shown in FIG. 17) by inductive coupling to the interrogator antenna. In embodiments described herein, all or some of the components of the passive detector as illustrated in FIGS. 16A, 16B, 16C, and 17 can be integrated onto the chiplet that includes the hardware TPM, e.g., a silicon chiplet.

Figure 18:
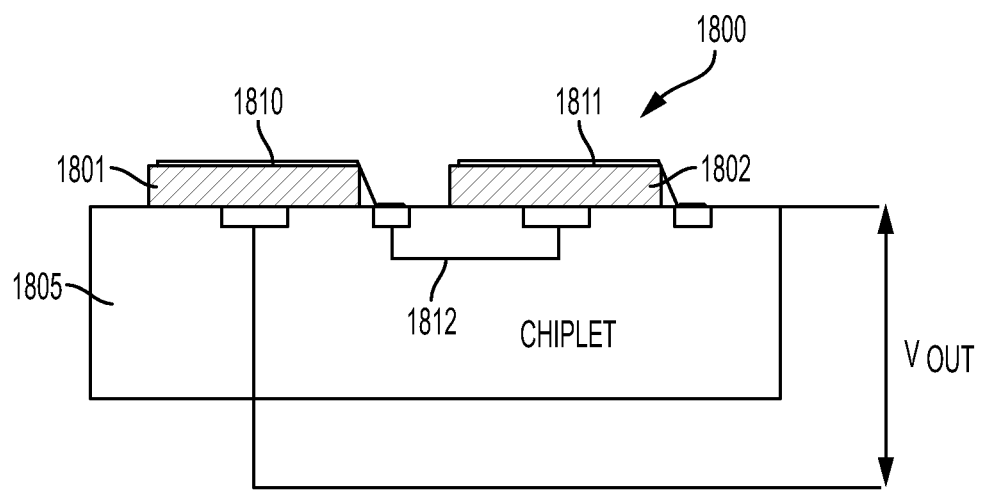
FIG. 18 shows a cross section of a light sensor that can be used in some embodiments of a passive detector.

FIG. 18 shows a cross section of a light sensor 1800 that can be used in some implementations of a passive detector. The light sensor 1800 includes two PIN photodiodes 1801, 1802 disposed on a chiplet 1805. For example, the PIN diodes 1801, 1802 may be formed of hydrogenated amorphous silicon (a-Si:H) disposed on a silicon chiplet. The PIN diodes 1801, 1802 are operated as solar cells connected in series through connections 1811, 1812, 1813 to increase the output programming voltage, Vout, of the sensor. It will be appreciated that additional PIN diodes could be connected in series (to further increase output voltage) and/or in parallel (to increase output current) if desired for a particular application. The PIN diodes can be deposited at low temperature (e.g., less than about 200 C) on standard Si CMOS wafers, with typical thicknesses in the 1 μm range. When used with no intentional bias, the PIN diodes behave similarly to solar cells, converting visible light to electrical energy with Voc in the 1 V range.

Figure 19:
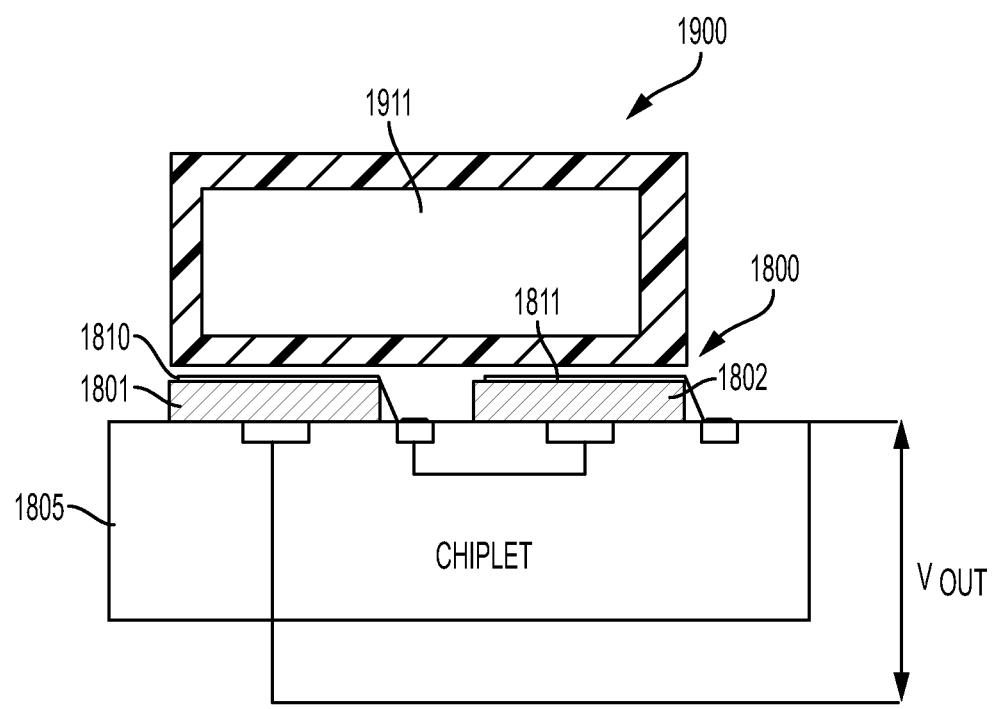
FIG. 19 shows a cross section of an x-ray sensor that can be used in some embodiments of a passive detector.

FIG. 19 illustrates a cross section of an x-ray sensor 1900 that can be used in some implementations of a passive detector. The x-ray sensor 1900 includes a light sensor 1900 as discussed in connection with FIG. 18, with a scintillation layer 1911, e.g., cesium iodide (CsI) deposited by thermal evaporation, disposed over the PIN photodiodes 1801, 1802. In some implementations, an x-ray photon, depending on the x-ray photon energy, can generate in the range of ten thousand visible photons, which are sensed by the PIN diodes 1801, 1802.

Figure 20:
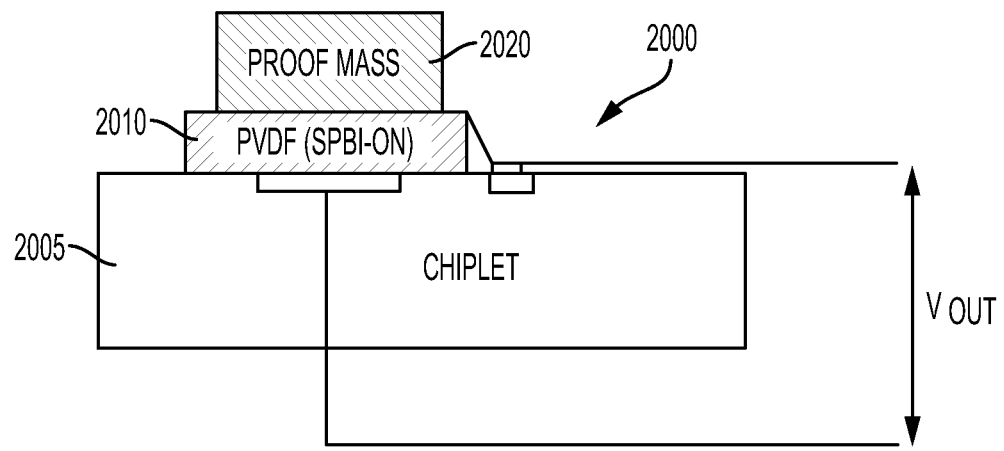
FIG. 20 shows a cross section of vibration sensor that can be used in some embodiments of a passive detector.

FIG. 20 shows a cross section of a vibration/acoustic sensor 2000 that can be used in some implementations of a passive detector. Sensor 2000 converts vibration to an output programming voltage at Vout. Piezoelectric material 2010, such as polyvinylidene fluoride (PVDF) is spun on the finished chiplet 2005 and a proof mass 2020 (e.g., a thin film metal) is deposited on the piezoelectric material 2010 after the piezoelectric material is annealed and polled. The piezoelectric material 2010 and proof mass 2020 may have a combined thicknesses on the order of about 10 μm and can be readily integrated on chiplets.

Figure 21:
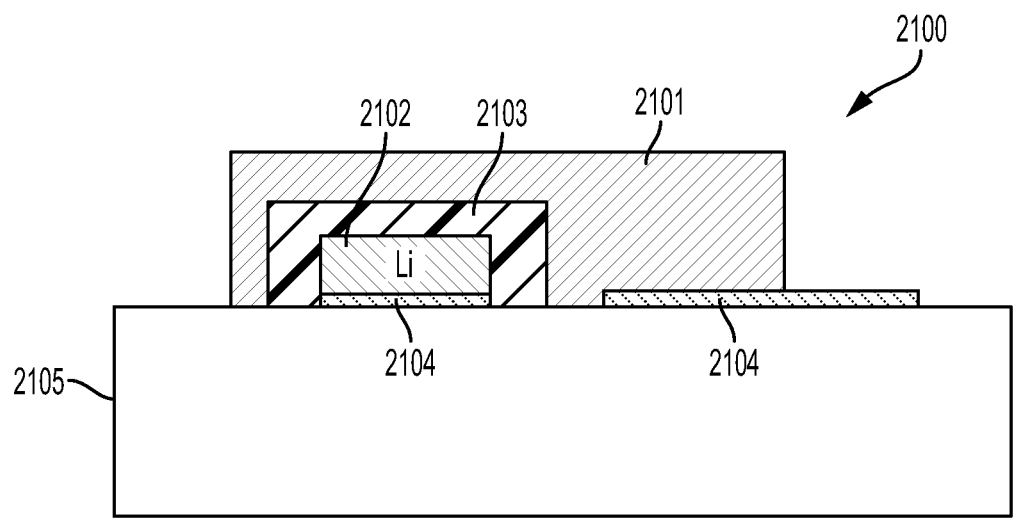
FIG. 21 shows a cross section of a chemical sensor that can be used in some embodiments of a passive detector.

FIG. 21 shows a cross section of a chemical sensor 2100 with battery-like electrodes that can be used in some implementations of a passive detector. The chemical sensor 2100 includes porous cathode 2101, e.g., porous carbon or graphite and anode 2102, e.g., lithium or zinc separated by a solid electrolyte material such as $Li_xPO_yN_z$. The cathode and anode materials are deposited on electrode layers 2104, e.g., Cu electrode layers, disposed on a chiplet 2105. The electrolyte material 2103 is activated by the presence of a chemical of interest, such as air, oxygen or water, which traverses the porous cathode to reach the electrolyte 2103. Activation of the electrolyte 2103 allows charge flow between the cathode and anode 2101, 2102, enabling current flow in the energy scavenging circuit.

The passive detector can be implemented as an intrusion detector to detect intrusion events that may occur, for example, when a counterfeit component is installed in an electronic system, or when a used, authentic component is removed from an electronic system. These intrusion events are accompanied by exposure of system components to one or more environmental parameters, such as air, humidity, light, x-rays, and/or chemicals used to dissolve packaging. Embodiments discussed herein can be implemented to provide a low cost and reliable approach for detection of intrusion events based on sensing environmental parameters associated with intrusion. In some embodiments, the data stored in the nonvolatile memory indicative of intrusion is read when the protected component is powered up. In some of these embodiments, power is applied at least to the nonvolatile memory when the component is powered up and the data stored in the nonvolatile memory may be accessed under power, e.g., via a parallel or serial bus.

Embodiments disclosed herein relate to a passive environmental detector. The passive detector includes a sensor configured to sense an environmental parameter and to generate an output signal at an output of the sensor in response to the sensed environmental parameter. An energy scavenging circuit is coupled to the sensor, the energy scavenging circuit configured to convert a first voltage, $V_1$, across the sensor to a second voltage, $V_2$, where $V_2 > V_1$. A discriminator powered by the voltage provided by the energy scavenger circuit and is coupled to the output of the sensor. A nonvolatile memory is coupled to an output of the discriminator. The discriminator is configured to compare the sensor output signal to a threshold and, in response to the sensor output signal being above the threshold, to provide a programming signal at the output of the discriminator. The programming signal is sufficient to cause data to be stored or erased in the nonvolatile memory. In general, the nonvolatile memory may be any type of memory, such as flash memory. In some embodiments, the programming signal generated by the discriminator is capable of changing the state of the nonvolatile memory cell from a first binary state to a second binary state and is incapable of changing the state of the flash memory cell from the second binary state to the first binary state.

In some implementations, the discriminator comprises multiple discriminators and the nonvolatile memory comprises multiple memory cells, each memory cell coupled to one of the discriminators and capable of storing one bit of the data. The data stored in the multiple memory cells provide information about an amount of exposure of the sensor to the environmental parameter above or below the threshold.

In some implementations, the nonvolatile memory comprises at least one multi-level memory cell. The programming signal provided by the discriminator stores or erases data in the multi-level memory cell. The data stored in the multi-level memory cell provides information about an amount of exposure of the sensor to the environmental parameter above or below the threshold.

Examples of environmental sensors suitable for use in a passive detector include one or more of a PIN diode, an X-ray sensor, a vibration sensor; and a chemical sensor. For example, the passive detector may use two or more of these sensor types.

Examples nonvolatile memory types suitable for a passive detector include one or more of flash memory, phase change memory, resistive random access memory, and magnetic memory.

As discussed in more detail above, the energy scavenger circuit of the passive detector can include a ring oscillator configured to oscillate in response to the first voltage generated by the sensor and a charge pump configured to convert the first voltage to the second voltage in response to oscillation of the ring oscillator. In some implementations, the passive detector includes interface and/or communication circuitry configured to interface and/or communicate with an external circuit, e.g., an external interrogator configured to interrogate the passive detector to access the data stored in the nonvolatile memory. The interrogation circuitry is configured to wirelessly interrogate the passive detector and may provide power to facilitate the communication. For example, in some configurations, the interrogation circuitry is configured to interrogate the passive detector by magnetic induction using an electromagnetic field generated by the interrogation circuitry.

In the above detailed description, numeric values and ranges are provided for various aspects of the implementations described. These values and ranges are to be treated as examples only, and are not intended to limit the scope of the claims. For example, embodiments described in this disclosure can be practiced throughout the disclosed numerical ranges. In addition, a number of materials are identified as suitable for various implementations. These materials are to be treated as exemplary, and are not intended to limit the scope of the claims.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A secured system comprising: at least one semiconductor chip comprising information processing circuitry;
an array of contact pads disposed on a surface of the chip and electrically coupled to the information processing circuitry;
one or more chiplets, each chiplet comprising at least a portion of at least one hardware trusted platform module that cryptographically secures the information processing circuitry, wherein the one or more chiplets are semiconductors and are removable from the chip;
and an array of electrically conductive microsprings comprising stress engineered layers, the array of electrically conductive microsprings, wherein the stress engineered layers provide for a stress gradient that causes the microsprings to bend into a shape of an arc having a radius r;
disposed on a surface of the chiplet and electrically coupled between the hardware trusted platform module and the contact pads.

2. The secured system of claim 1, further comprising a mechanical socket that holds the microsprings in mechanical and electrical contact with the contact pads.

3. The secured system of claim 1, further comprising a layer of encapsulant that attaches the chiplet to the chip and holds the microsprings in mechanical and electrical contact with the contact pads.

4. The secured system of claim 1, wherein the microsprings are soldered to the contact pads.

5. The secured system of claim 1, wherein the microsprings are welded to the contact pads.

6. The secured system of claim 1, wherein the pitch of the microspring array is in a range of about 0.5 µm to 2000 µm.

7. The secured system of claim 1, wherein the microspring array is configured to provide for communication between the information processing circuitry and the hardware trusted platform module at a bandwidth in a range of 1 gigabit per second per layer per millimeter of linear distance along an edge of the chiplet to 10 terabits per second per layer per millimeter of linear distance along an edge of the chiplet.

8. The secured system of claim 1, wherein the one or more chiplets are removable from the chip without degrading operation of the information processing circuitry.

9. The secured system of claim 1, wherein the chiplet comprises at least a portion of a second hardware trusted platform module that is incompatible with the information processing circuitry.

10. The secured system of claim 1, wherein the chiplet comprises the entire hardware trusted platform module for the information processing circuitry.

11. The secured system of claim 1, wherein a first portion of the hardware trusted platform module is disposed on the chiplet and a second portion of the hardware trusted platform module is disposed on the chip.

12. The secured system of claim 1, wherein the one or more chiplets comprises multiple chiplets, each chiplet including a different portion of the hardware trusted platform module.

13. The secured system of claim 12, wherein:
the one or more chiplets comprises a first chiplet that includes a first portion of the hardware trusted platform module and a second chiplet that includes a second portion of the hardware trusted platform module; and further comprising:
a second array of contact pads disposed on a surface of the first chiplet and electrically coupled to the first portion of the hardware trusted platform module; and
a second array of electrically conductive microsprings disposed on a surface of the second chiplet and electrically coupled between the first portion of the hardware trusted platform module and the second contact pads.

14. The secured system of claim 1, wherein the information processing circuitry comprises communication circuitry.

15. The secured system of claim 1, wherein the hardware trusted platform module is configured to perform one or more of software verification, cryptographic key decryption, and device authentication.

16. The secured system of claim 1, wherein:
the at least one semiconductor chip comprises:
a first chip that includes first information processing circuitry; and
a second chip that includes second information processing circuitry, the first chip spaced apart from the second chip by a distance;
the array of contact pads comprises:
a first portion of the array of contact pads disposed on the first chip and electrically coupled to the first information processing circuitry; and
a second portion of the array of contact pads disposed on the second chip and electrically coupled to the second information processing circuitry;
the chiplet is arranged to bridge between the first chip and the second chip;
the array of microsprings comprises:
a first set of the microsprings electrically coupled between the hardware trusted platform module and the first portion of the array of contact pads; and
a second portion of the array of microsprings electrically coupled between the hardware trusted platform module and the second portion of the array of contact pads.

17. The secured system of claim 1, further comprising tamper detection circuitry configured to indicate an attempt to tamper with the chiplet.

18. The secured system of claim 17, wherein the tamper detection circuitry is a passive circuit.

19. The secured system of claim 17, wherein the tamper detection circuitry is configured to detect exposure of the chiplet to one or more of light, x-rays, vibration, and a chemical.

20. A device comprising:
one or more semiconductor chiplets, each chiplet comprising at least a portion of at least one hardware module configured to communicate with information processing circuitry that is not disposed on the chiplet, wherein the one or more chiplets are semiconductors and are removable from the chip;
and an array of electrically conductive microsprings comprising stress engineered layers, the array of electrically conductive microsprings wherein the stress engineered layers provide for a stress gradient that causes the microsprings to bend into a shape of an arc having a radius r;
disposed on a surface of the removable semiconductor chiplet and electrically coupled to the hardware module, the microsprings configured to make electrical contact with contact pads disposed on a surface of a chip and electrically coupled to the information processing circuitry.

21. The device of claim 20, wherein the pitch of the microspring array is in a range of about 0.5 µm to 2000 µm.

22. The device of claim 20, wherein the chiplet comprises at least portions of multiple hardware modules respectively configured to communicate with multiple types of information processing circuitry.

23. The device of claim 20, wherein the chiplet includes tamper detection circuitry configured to indicate an attempt to tamper with the chiplet.

24. The device of claim 23, wherein the tamper detection circuitry is a passive circuit.

25. The device of claim 23, wherein the tamper detection circuitry is configured to detect exposure of the chiplet to one or more of light, x-rays, vibration, and a chemical.

26. A secured system comprising:
at least one semiconductor chip comprising information processing circuitry;
one or more chiplets removably attached to the chip, each chiplet comprising at least a portion of at least one hardware module that cryptographically secures the information processing circuitry, wherein the one or more chiplets are semiconductors;
and an array of electrical microspring connections electrically coupled between the hardware trusted platform module and the contact pads, wherein the electrical microspring connections comprise stress engineered layers and are configured to provide for communication between the information processing circuitry and the hardware trusted platform module at a bandwidth in a range of 1 gigabit per second per layer per millimeter of linear distance along an edge of the chiplet to 10 terabits per second per layer per millimeter of linear distance along an edge of the chiplet, wherein the stress engineered layers provide for a stress gradient that causes the microsprings to bend into a shape of an arc having a radius r.

27. A method comprising:
generating electrical signals representing security information in information processing circuitry disposed on a semiconductor chip;
transferring the electrical signals though an array of electrically conductive microsprings to a chiplet removably mounted to the chip, the chiplet comprising at least a portion of a hardware trusted platform module and the array of electrically conductive microsprings comprising stress engineered layers, wherein the stress engineered layers provide for a stress gradient that causes the microsprings to bend into a shape of an arc having a radius r;
verifying the security information in the hardware trusted platform module;
and providing secure operation of the information processing circuitry based on verifying the security information.

* * * * *